US010997763B2

United States Patent
Thomson et al.

(10) Patent No.: US 10,997,763 B2
(45) Date of Patent: May 4, 2021

(54) FACE SYNCING IN DISTRIBUTED COMPUTING ENVIRONMENT

(71) Applicant: Apple Inc., Cupertino, CA (US)

(72) Inventors: Gavin B. Thomson, Mountain View, CA (US); Eric Circlaeys, Los Gatos, CA (US); Paul M. Bombach, Palo Alto, CA (US); Tony F. Kinnis, San Jose, CA (US); Baskaran Subramaniam, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 16/511,820

(22) Filed: Jul. 15, 2019

(65) Prior Publication Data

US 2019/0340801 A1 Nov. 7, 2019

Related U.S. Application Data

(63) Continuation of application No. 15/613,098, filed on Jun. 2, 2017, now Pat. No. 10,403,016.

(51) Int. Cl.
| | | |
|---|---|---|
| *G06T 11/60* | (2006.01) | |
| *G06K 9/00* | (2006.01) | |
| *G06K 9/62* | (2006.01) | |
| *H04L 29/08* | (2006.01) | |

(52) U.S. Cl.
CPC .......... *G06T 11/60* (2013.01); *G06K 9/00677* (2013.01); *H04L 67/1095* (2013.01); *G06K 9/00228* (2013.01); *G06K 9/00288* (2013.01); *G06K 9/6218* (2013.01); *G06T 2200/24* (2013.01); *G06T 2210/22* (2013.01)

(58) Field of Classification Search
CPC . G06T 11/60; G06T 2200/24; G06T 2210/22; G06K 9/00677; G06K 9/00228; G06K 9/00288; G06K 9/6218; H04L 67/1095
See application file for complete search history.

(56) References Cited

U.S. PATENT DOCUMENTS

| | | | |
|---|---|---|---|
| 6,724,920 B1 ‡ | 4/2004 | Berenz ............... | G06K 9/00221 180/16 |
| 7,551,755 B1 * | 6/2009 | Steinberg ........... | G06K 9/00228 340/5.53 |
| 7,555,148 B1 * | 6/2009 | Steinberg ............ | G06F 16/583 382/118 |
| 7,558,408 B1 * | 7/2009 | Steinberg ........... | G06K 9/00288 340/5.53 |
| 7,564,994 B1 * | 7/2009 | Steinberg ............ | G06F 16/583 382/118 |

(Continued)

*Primary Examiner* — King Y Poon
*Assistant Examiner* — Vincent Peren
(74) *Attorney, Agent, or Firm* — Invoke

(57) ABSTRACT

Embodiments are disclosed for face syncing in a distributed computing environment. In an embodiment, a method comprises: obtaining, by a processor, media assets that include faces of individuals; detecting, by the processor of a mobile device, the faces on the media assets; generating, by the processor, faceprints for the detected faces; clustering, by the processor, the faceprints into clusters; generating, by the processor, a face crop image for each cluster; and sending, by the processor, the face crop images to a network-based, distributed syncing service.

20 Claims, 19 Drawing Sheets

(56) References Cited

U.S. PATENT DOCUMENTS

| | | | | |
|---|---|---|---|---|
| 8,199,979 B2* | 6/2012 | Steinberg | G06K 9/00288 | 382/118 |
| 8,553,949 B2* | 10/2013 | Steinberg | G06K 9/00208 | 382/118 |
| 8,897,504 B2* | 11/2014 | Steinberg | G06K 9/00295 | 382/118 |
| 10,019,136 B1* | 7/2018 | Ozog | H04N 21/466 | |
| 10,027,726 B1* | 7/2018 | Ozog | H04L 67/306 | |
| 10,027,727 B1* | 7/2018 | Ozog | G06K 9/00288 | |
| 2007/0237364 A1‡ | 10/2007 | Song | G06K 9/00369 | 382/11 |
| 2008/0089561 A1* | 4/2008 | Zhang | G06K 9/623 | 382/118 |
| 2008/0298766 A1* | 12/2008 | Wen | G06F 16/5854 | 386/282 |
| 2009/0028393 A1* | 1/2009 | Kim | G06F 16/583 | 382/118 |
| 2009/0034805 A1* | 2/2009 | Perlmutter | G06F 16/5838 | 382/118 |
| 2010/0014721 A1* | 1/2010 | Steinberg | G06K 9/00288 | 382/118 |
| 2010/0066822 A1* | 3/2010 | Steinberg | G06K 9/00208 | 348/77 |
| 2010/0287053 A1* | 11/2010 | Ganong | G06K 9/00248 | 705/14.66 |
| 2011/0123071 A1‡ | 5/2011 | Shah | G06K 9/00288 | 382/118 |
| 2011/0182482 A1* | 7/2011 | Winters | G06F 16/5838 | 382/116 |
| 2011/0211736 A1* | 9/2011 | Krupka | G06K 9/00677 | 382/118 |
| 2013/0050460 A1* | 2/2013 | Steinberg | G06K 9/622 | 348/77 |
| 2013/0210808 A1‡ | 8/2013 | Maelicke | C07D 307/91 | 514/21 |
| 2016/0300101 A1‡ | 10/2016 | Yu | G06F 17/30274 | |
| 2016/0371566 A1* | 12/2016 | Jiang | G06F 16/00 | |
| 2017/0192965 A1‡ | 7/2017 | Loscalzo | G06F 17/3002 | |
| 2018/0025218 A1* | 1/2018 | Steinberg | G06K 9/00295 | 715/822 |

\* cited by examiner

‡ imported from a related application

FACE SYNCING IN DISTRIBUTED COMPUTING ENVIRONMENT

INCORPORATION BY REFERENCE; DISCLAIMER

The following application is hereby incorporated by reference: application Ser. No. 15/613,098 filed on Jun. 2, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

This disclosure relates generally to face detection and syncing in distributed computing environments.

BACKGROUND

Modern computing devices often include an application to access, organize and share digital photos and videos ("media assets"). These media assets are typically stored in a local library on the computing device, and for some applications, also stored remotely on a network server. The local library can be synchronized with the remote library to ensure coherency between the libraries. If a user edits a media asset on a mobile computing device, the edited media asset can be "synced" to the remote library. The user can then access the edited photo using another computing device.

Some applications provide face detection where a media asset library is scanned to detect human faces. The detected faces are presented to the user in a graphical user interface (GUI) that allows the user to confirm or reject the detected faces, which are then tagged with metadata. Once a face is tagged, the face detection process searches the media asset library to find other media assets that include the tagged face. The user can create collections of media assets that include a specific individual whose face was tagged.

To protect user privacy, some applications encrypt the media assets before syncing the assets with an online library. Because the media assets are stored encrypted in the online library, face detection is performed on the user's computing device. In such applications, maintaining consistency of face detection results among multiple user computing devices is challenging. For example, the user's computing devices may be running different versions of the face detection technology which may provide inconsistent face detections.

SUMMARY

Embodiments are disclosed for face syncing m a distributed computing environment.

In an embodiment, a method comprises: obtaining, by a processor, media assets that include faces of individuals; detecting, by the processor of a mobile device, the faces on the media assets; generating, by the processor, faceprints for the detected faces; clustering, by the processor, the faceprints into clusters; generating, by the processor, a face crop image for each cluster; and sending, by the processor, the face crop images to a network-based, distributed syncing service.

In an embodiment, a system comprises: one or more processors; memory coupled to the one or more processors and configured to store instructions, which, when executed by the one or more processors, causes the one or more processors to perform operations comprising: obtaining media assets that include faces of individuals; detecting the faces on the media assets; generating faceprints for the detected faces; clustering the faceprints into clusters; generating a face crop image for each cluster; and sending the face crop images to a network-based, distributed syncing service.

Particular embodiments disclosed herein provide one or more of the following advantages. The disclosed embodiments allow synchronizing face detection data across multiple computing devices in a distributed computing environment where the media assets are stored online (in the cloud) in encrypted form. Face detection results can differ from device to device in a distributed computing environment. For example, a face detection algorithm operating on a first device may yield 10 faces and a face detection algorithm on a second device (e.g., running a different version of the algorithm, hardware variations) may yield 9 faces. The disclosed embodiments are robust to such inconsistent face detection results. Accordingly, the benefits of face syncing in a distributed computing environment can be realized without sacrificing user privacy.

The details of one or more implementations of the subject matter are set forth in the accompanying drawings and the description below. Other features, aspects and advantages of the subject matter will become apparent from the description, the drawings and the claims.

DETAILED DESCRIPTION

Example Face Detection System

Figure 1:
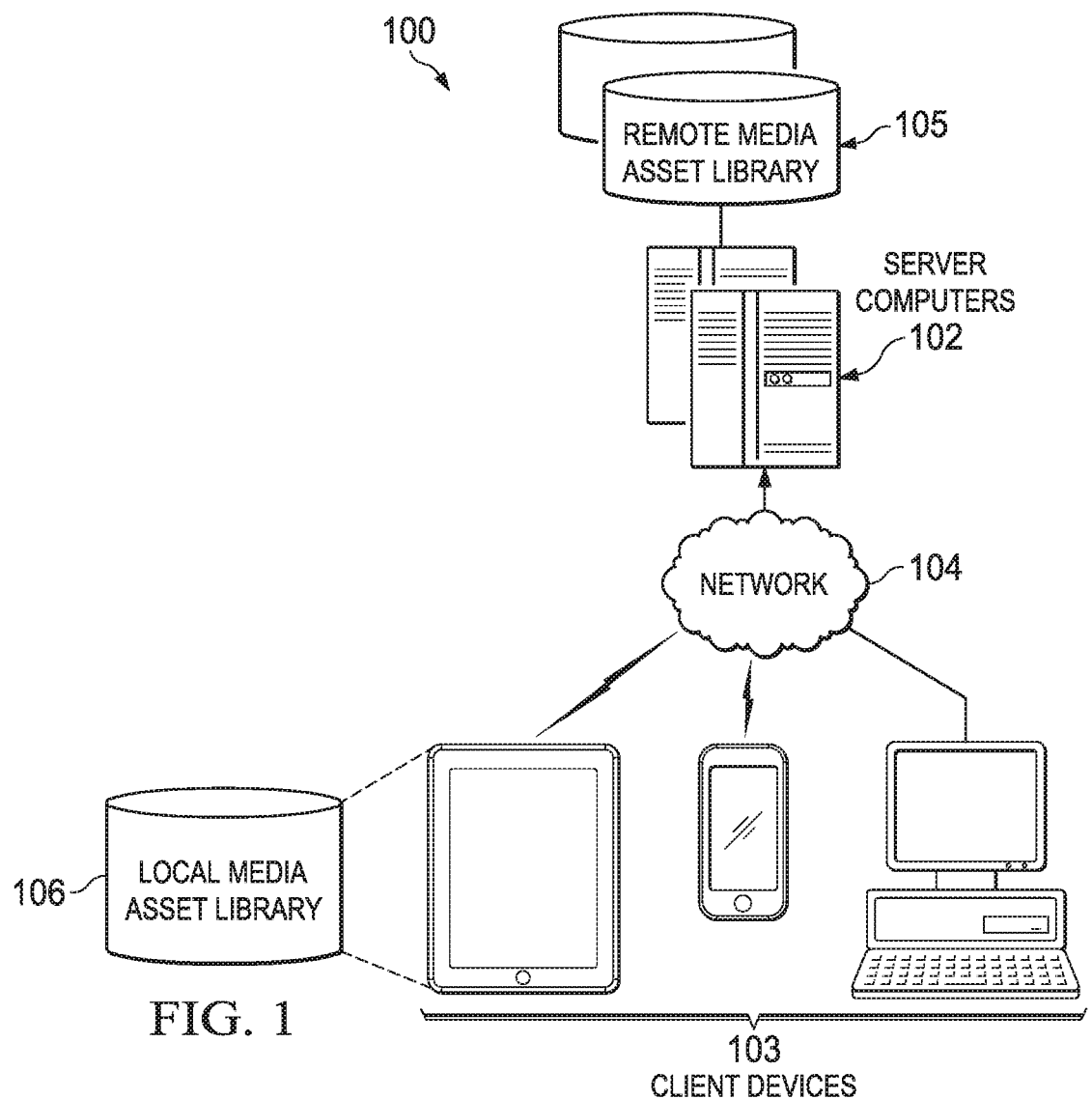
FIG. 1 illustrates an example distributed computing environment, according to an embodiment.

FIG. 1 illustrates an example distributed computing environment 100, according to an embodiment. Environment 100 includes server computers 102, client devices 103, network 104, remote media asset library 105 and local media asset library 106. Client devices 103 include any device that can run an application and communicate with servers 102, including: desktop computers, notebook computers, smartphones, tablet computers and wearable computers (e.g., a smartwatch). Network 104 can be a wide area network (WAN), such as the Internet. Remote and local media asset libraries 105, 106 store media assets and face detection data in storage devices. Note that each client device 103 will have a local media asset library 106 but only one is shown in FIG. 1.

Server computers 102 can be part of a distributed computing system that uses parallel processing architecture. Server computers 102 are configured to provide client devices 103 access to remote media asset library 105, and syncing services for syncing media assets and face detection data between local media asset library 106 and remote media asset library 105. Encrypted copies of media assets and face detection data are stored in remote media asset library 105 to protect user privacy. The syncing service syncs the media assets across client devices 103 through network 104.

Because the media assets are encrypted, face detection cannot be run on media assets stored in remote media asset library 105. Instead, face detection is run on client devices 103 using local media asset library 106. Although the media assets can be synced between remote and local media asset libraries 105, 106, syncing face detection data presents an additional challenge. For example, different versions of the face detection technology may be running on different client devices 103 and provide different results. The results of face detection are typically used to create collections of media assets with a face or faces of a particular individual or individuals. If face detection results differ from device to device, then the media assets (e.g., media assets for a particular individual) that are included in these collections may also differ from device to device. For example, a first photo album on a first client device may have more, fewer or different photos than photos in a second photo album on a second client device. Because the user expects the photo albums to include the same photos, the user's expectations may not be met, resulting in a poor user experience. This problem of inconsistent face detection results on different client devices 103 is addressed by system 200, as described in reference to FIG. 2.

Figure 2:
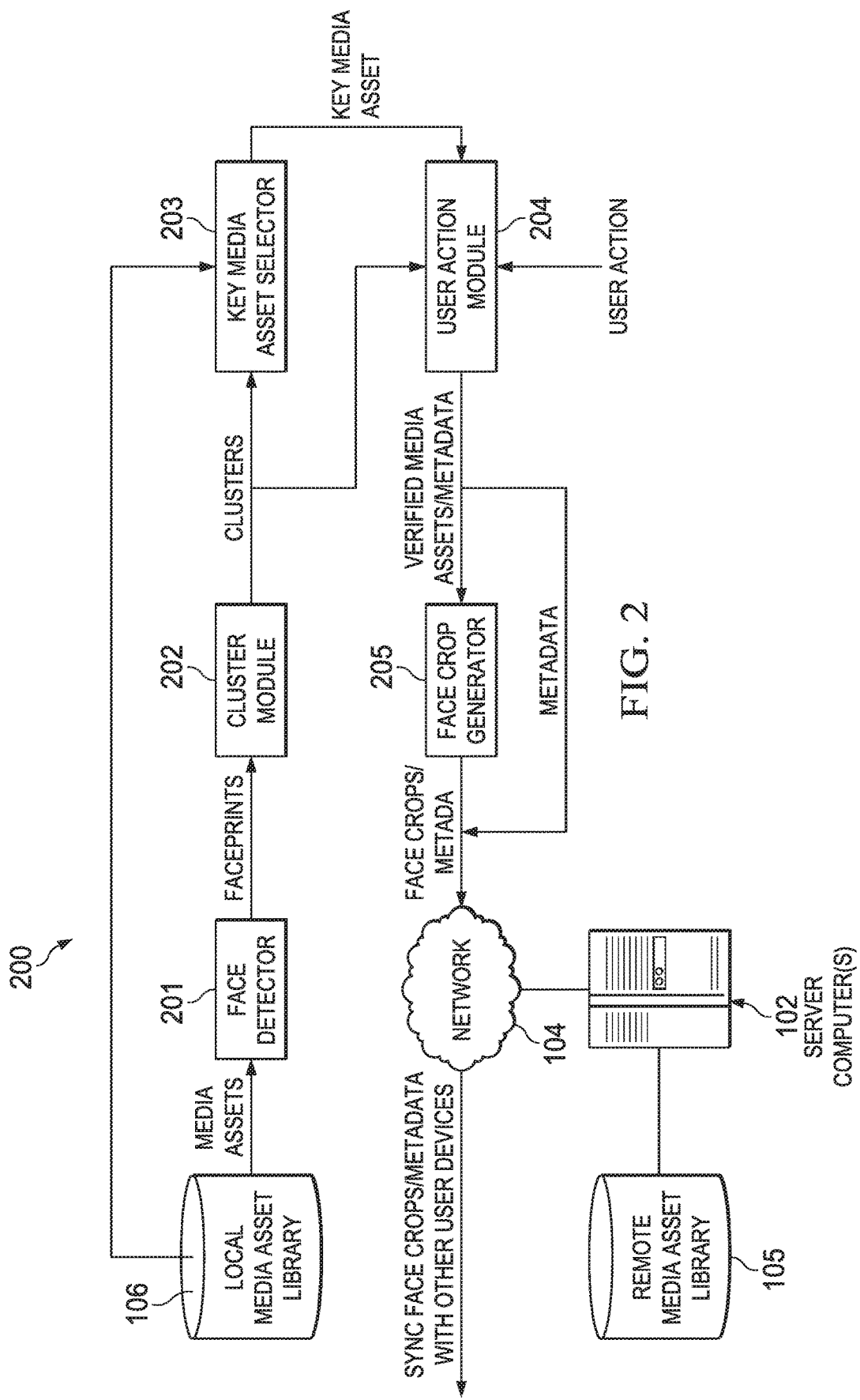
FIG. 2 is an example system for face syncing in a distributed computing environment, according to an embodiment.

FIG. 2 is an example system 200 for face syncing in a distributed computing environment, according to an embodiment. System 200 includes local media asset library 106, face detector 201, cluster module 202, key media asset selector 203, user action module 204 and face crop generator 205. System 200 can be included in each client device 103, which communicates with server computers 102 over network 104 to sync media assets and face detection data (e.g., a face crop and associated metadata as described below) with client devices 103 using a syncing service run by server computers 102.

Media assets (e.g., photographs, videos) are stored in local media asset library 106. The media assets can be captured on one of client devices 103 using an embedded camera or received in another manner (e.g., received from remote media asset library 105). Client devices 103 can include a client-side application that is used to manage local media asset library 106 and allows a user to perform various tasks with the media assets. For example, the client application may allow the user to edit media assets, create slideshows or movies with the media assets and create collections of media assets (e.g., create photo albums) that can be shared with friends and family. The collections can be based on themes (e.g., holidays), content (e.g., based on people) and user-defined metadata (e.g., photos tagged by the user as a "favorite" or photos that the user "liked").

Face detector 201 applies face detection technology to the locally stored media assets. Any suitable face detection technology can be used, including but not limited to face detection technology that uses appearance-based methods that rely on statistical analysis, machine learning or supervised learning (e.g., neural networks) to find relevant characteristics of face and non-face images. The learned characteristics can be in the form of distribution models or discriminant functions that are used for face detection.

For example, a feature vector (hereinafter also referred to as a "faceprint") derived from an image can be used as a random variable that is characterized for faces and non-faces using Bayesian classification, or maximum likelihood, to classify a candidate image location as face or non-face. In an embodiment, eigenfaces can be used for face detection using techniques described in Navarrete et al. "*Analysis and Comparison of Eigenspace-Based Face Recognition Approaches*," International Journal of Pattern Recognition and Artificial Intelligence, 16 (7): 817-830 (Nov. 2002). In another embodiment, a distribution-based system for face detection can be used as described in Kah-Kay Sung and Tomaso Poggio, "*Example-Based Learning for View-Based Human Face Detection*," Technical Report AI Memo 1521, Massachusetts Inst. Of Technology AI Lab, 1994.

The output of face detector 201 is one or more faceprints for each media asset that includes one or more detected faces. For example, a photo that has two detected faces will generate two faceprints, one for each face detection. In an embodiment, a faceprint is a feature vector defined in n-space that uniquely identifies a face image but does not associate a name with the face. An additional step of face verification or rejection is performed by user actions, as described in reference to FIGS. 4-6.

Cluster module 202 receives the faceprints and applies a clustering process on the faceprints to generate one or more clusters of faceprints based-on statistical similarity between the faceprints. Any suitable clustering algorithm can be used. The clustering can be performed periodically or in response to a trigger event, such as in response to a new media asset being added to local media asset library 106. Any suitable clustering technique can be used to cluster faceprints, including but not limited to k-means, hierarchical cluster analysis (HCA) and DBSCAN.

A key media asset is selected from the media assets in each cluster. The key media asset for a cluster is a media asset that has a faceprint in the cluster and that represents all the media assets in the cluster. The key media asset can be selected based on any suitable criteria. In an embodiment, the key media asset can be based on a centroid of the cluster. For example, the media asset in a cluster that has a faceprint that is nearest to the centroid of the cluster can be selected as the key media asset. Additionally, the key media asset can be based on specific attributes of the media asset, including but not limited to: whether a face in the media asset is smiling, whether the face is a frontal view or rotated, whether the face is in the background or foreground, the quality of the lighting, location, noise or blurriness, type of media asset (e.g., photo, video frame) and any other suitable criteria. Since the key media asset will be presented to the user in a GUI, it is desirable to select a key media asset that provides a flattering image of the user.

After the key media asset is selected, the key media asset is input to user action module 204. In an embodiment, user action module 204 generates GUIs that display media assets in a cluster or a key media asset and requests the user take certain user actions with respect to the media assets. For example, various affordances are provided by the GUI that allow the user to add names to faces in a cluster, merge face clusters, confirm or reject names assigned to faces and confirm or reject suggested names for faces.

Once a user associates a name with a face, the other media assets in the cluster will also be associated with the name and the cluster will become a verified cluster. When a new media asset is added to local media asset library 106 that includes a face, a faceprint of the face is compared with the faceprints for the key media assets of all the clusters using a suitable distance metric, such as a Euclidian distance metric. The new media asset can then be assigned to the cluster having a key media asset faceprint that is closest to the faceprint for the new media asset based on the distance metric.

After a key media asset is associated with a name, the key media asset is input to face crop generator 205 and metadata describing the user action (e.g., user confirmation or rejection is created. Face crop generator 205 generates a face crop from the key media asset or another media asset, which is sent together with user action metadata, and optionally other metadata (e.g., name, contact ID, "favorites", "likes"), collectively the "face detection data," to server computers 102.

During syncing, the face detection data is transferred to each of client devices 103. The face crop image is processed like any other media asset and is included in the local clustering on client device 103 and processed as described above. The face crop will be included in a cluster and every faceprint in the same cluster will be associated with the person associated with the face crop image and associated metadata (e.g., name, contact ID, "favorites", "likes"). The cluster becomes a verified cluster due to the user confirmed face crop image. Any conflicts that arise on the client device as a result of syncing can be resolved through user actions, as described in further detail below in reference to FIGS. 7-20. For example, if clustering was performed on a device while the device is offline, two face crop images may be present in a cluster. The user will be presented with a GUI to resolve the conflict by selecting one of the two face crop images to be the truth face.

Figure 3:
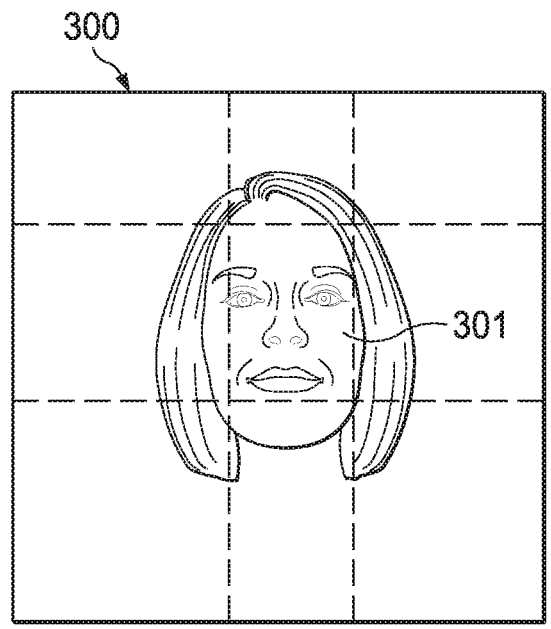
FIG. 3 illustrates an example face crop image, according to an embodiment.

FIG. 3 illustrates an example of face crop image 301, according to an embodiment. Face crop generator 205 creates face crop image 301 of a face detected in key media asset 300 to be used as face truth data for face clustering and conflict resolution on client devices 103. In an embodiment, face crop image 301 is encrypted. In another embodiment, face crop image 301 is generated such that the face cannot be recognized (e.g., no hair or outline of the face is captured in the face crop image).

In an embodiment, metadata associated with the face crop image 301 (e.g., user contact information) can also be used as a source of "truth" in addition to face crop image 301. For example, if a face of John Doe is verified on a first device, a person profile is created for John Doe on the first device and associated with contact information for John Doe (e.g., provided by the user). The contact information is stored in remote database 105 with the face crop image. A person created on a second device that is associated with the contact information of John Doe is merged with a person profile of John Doe on the second device based on the assumption that the person created on the second device is the same John Doe created on the first device.

In an embodiment, face crop image 300 is cropped from a media asset other than a key media asset. For example, if a user action to resolve a conflict includes naming a single face that is assigned or unassigned to a cluster, or a single face that is rejected, the face crop image can be taken from the single face rather than the key media asset for the cluster, as described in reference to FIGS. 9-11. Face crop 300 can be encrypted before being sent to server computers 102.

Example GUIs for User Actions

Figure 4:
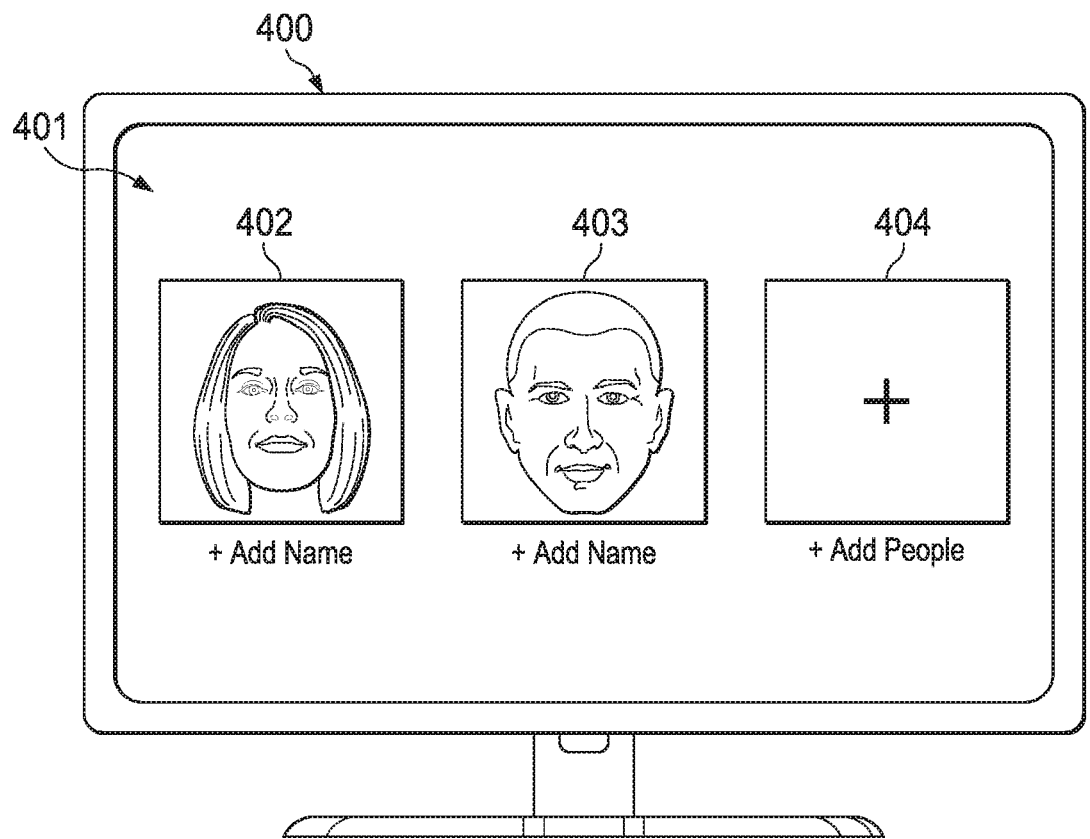
FIG. 4 illustrates an example GUI for adding names to faces, according to an embodiment.

FIG. 4 illustrates an example GUI for adding names to detected faces, according to an embodiment. In this example, computer display 400 presents GUI 401 that includes two media assets, which in this example are photos. The photos can be, for example, photos assigned to the same cluster but not verified by the user. The user may click on the "+ add name" affordance which opens a text box that allows the user to type in a name for the media asset. Once the name is added the name will become metadata associated with the photo and the photo is assigned to a cluster of other photos associated with the name. Additionally, the user can use affordance 404 to add other photos from local media asset library 201.

Figure 5A:
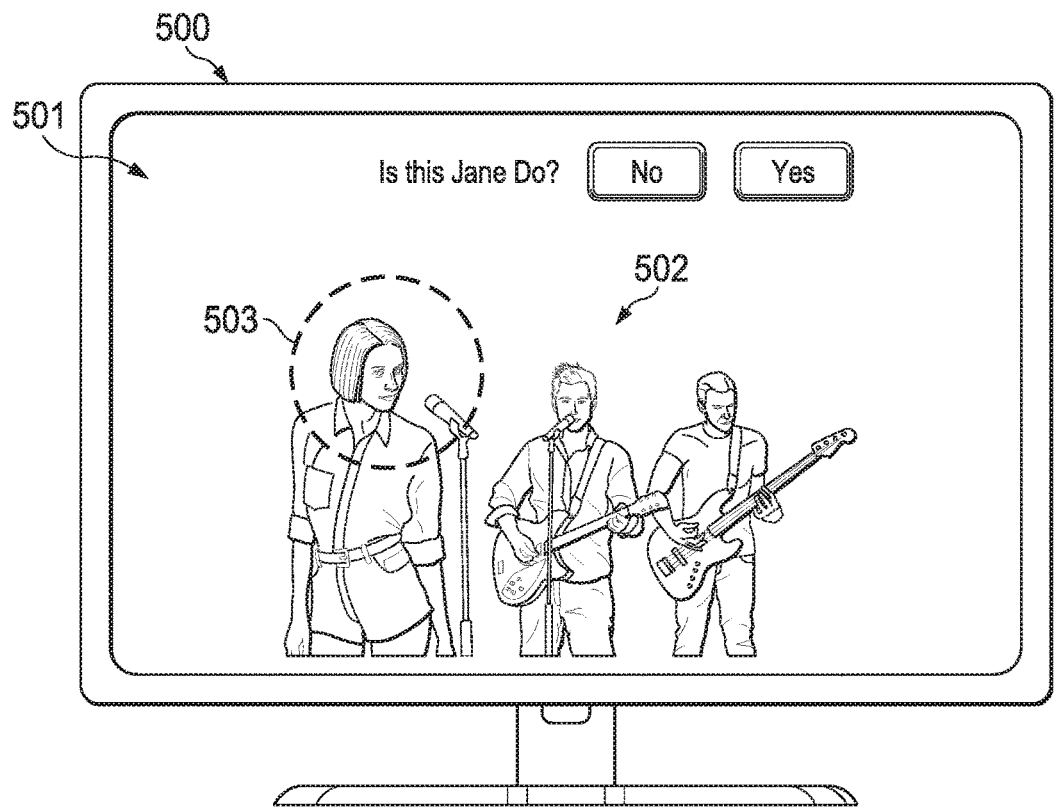
FIG. 5A illustrates an example GUI for allowing a user to confirm or reject a named face, according to an embodiment.

FIG. 5A illustrates an example GUI 501 for allowing a user to confirm or reject a named face, according to an embodiment. In this example, computer display 500 presents GUI 501 which includes media asset 502 with a face that is highlighted by window 503. Window 503 can be any desired shape (e.g., circle, oval, rectangle). Window 503 calls to the user's attention a particular face in media asset 502. The user is presented with the question "Is this Jane Do?" The user responds by selecting, touching or clicking the "No" or "Yes" affordance (e.g., virtual buttons), which rejects or confirms, respectively, the association of the name Jane Doe with the face in window 503. Whether confirmed or rejected by the user, metadata describing the confirmation or rejection is associated with media asset 502. If the user confirms the face as belonging to Jane Doe, then the highlighted face from media asset 502 will be assigned to the cluster that includes faceprints of faces of Jane Doe and the user verification will become part of the metadata associated with the face detection on media asset 502. If the user rejects the face as belonging to Jane Doe, then a rejected face crop will be generated along with metadata indicating that the face detected on media asset 502 is not Jane Doe. Subject to conflicts, any cluster that the rejected face crop lands in will not be assigned to Jane Doe.

Figure 5B:
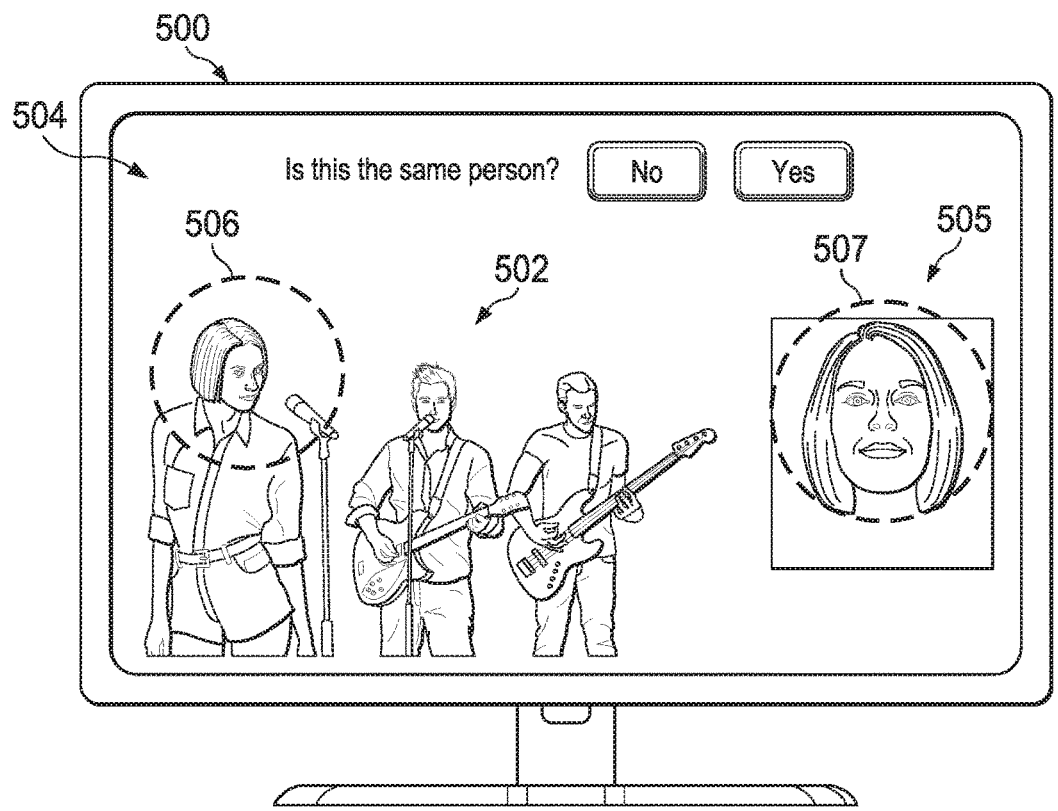
FIG. 5B illustrates an example GUI for allowing a user to confirm or rejection an unnamed face, according to an embodiment.

FIG. 5B illustrates an example GUI 504 for allowing a user to confirm or reject an unnamed face, according to an embodiment. In this example, computer display 500 presents GUI 504 that includes media asset 502 and media asset 505 with faces that are highlighted by windows 506 and 507, respectively. The user is presented with the question "Is this the same person?" The user responds by selecting, touching or clicking the "No" or "Yes" affordance (e.g., virtual buttons), which rejects or confirms, respectively, the suggestion that the faces in media assets 502 and 505 are the same person. Whether confirmed or rejected by the user, metadata that includes the confirmation or rejection is associated with faces detected on media assets 502, 505. If the user confirms the faces in media assets 502 and 505 as belonging to the same person, then media assets 502, 505 will be associated with each other so that they will be assigned to the same cluster when one is generated. If the user rejects the faces as both belonging to the same person, media assets 502, 505 will not be assigned to the same cluster. It is important to note it is not the entire media asset that gets rejected or confirmed for a person. It is only the face presented to the user.

Figure 6:
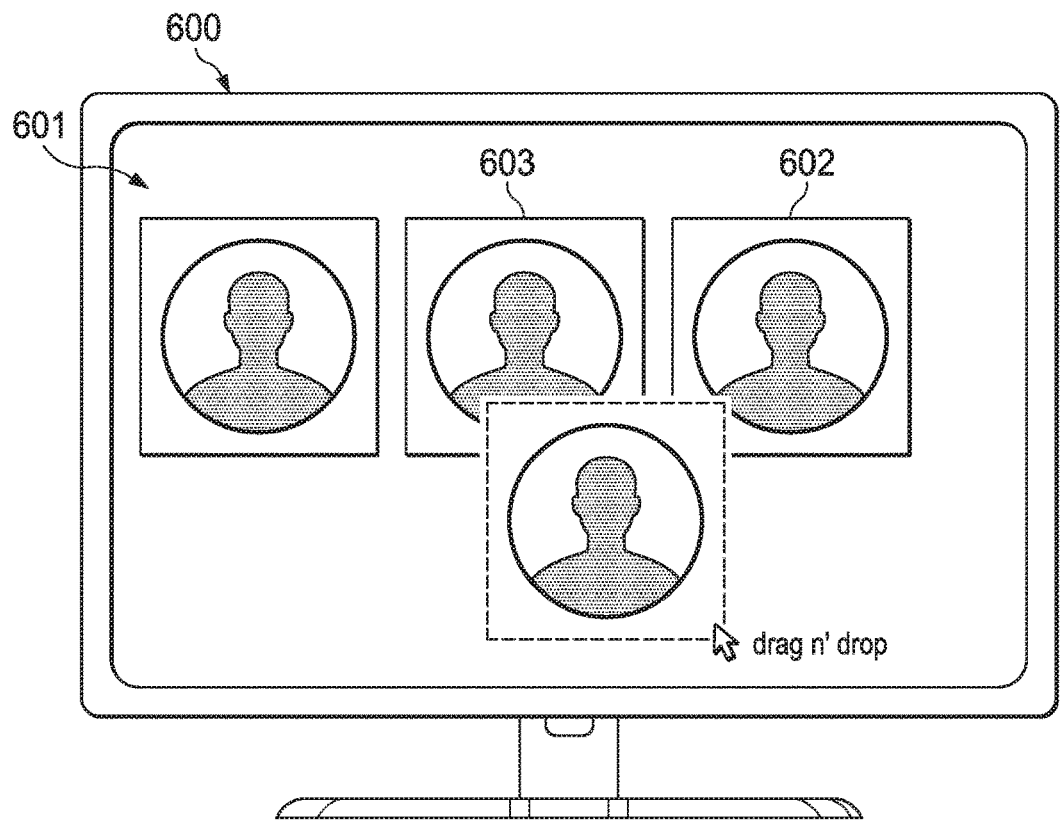
FIG. 6 illustrates an example GUI for merging and adding faces, according to an embodiment.

FIG. 6 illustrates an example GUI 600 for merging and adding face detections, according to an embodiment. In this example, computer display 600 presents GUI 601 that includes four media assets, which in this example are photos. The user can use GUI 601 to merge clusters of media assets. For example, the user can drag n' drop photo cluster 602 represented by its key media asset onto photo cluster 603 which is also represented by its key media asset. Each The result is that the first and second clusters are assigned to the same person. In an embodiment, as an alternative to drag n' drop, the user can select each photo cluster individual by click on the key media asset and then pressing a merge and add affordance displayed by the GUI 601 (not shown).

Examples of Resolution Based on User Actions

Due to the nature of the clustering process and variances in the media assets due to different client device hardware (e.g., different graphical processing units), described above, there may be situations where certain media assets are not assigned to clusters or assigned to the wrong cluster or assigned to multiple clusters. Solicited user actions can be used to resolve the conflicts on the client device. Each figure below illustrates how the conflicts are resolved. The letter "K" stands for key media asset. The key media asset is also shown in the figure with a striped fill pattern. The letter "C" stands for face crop image, which is created from a key media asset in response to user confirmation. The letter "$R_F$" stands for a face crop image created from a key media asset in response to user rejection. The letter "$C_F$" stands for a face crop image made from single face rather than a key media asset. The letter "$P_V$" stands for verified person. The letter "$P_U$" stands for unverified person. The superscripts on any letter represent different key media assets, different face crop images, different clusters or different verified or unverified persons depending on the letter superscripted. For example, $K^1$ means a key media asset for cluster 1, $K^2$ means a key media asset for cluster 2 and so forth. Similarly, $P_U^1$ means unverified person 1, and $P_U^2$ means unverified person 2, $P_V^1$ means verified person 1 and $P_V^2$ means verified person 2. Each cluster of media assets associated with a person is considered unverified until verified through a user action, as described below. Face crops are generated from verified clusters.

Figure 7:
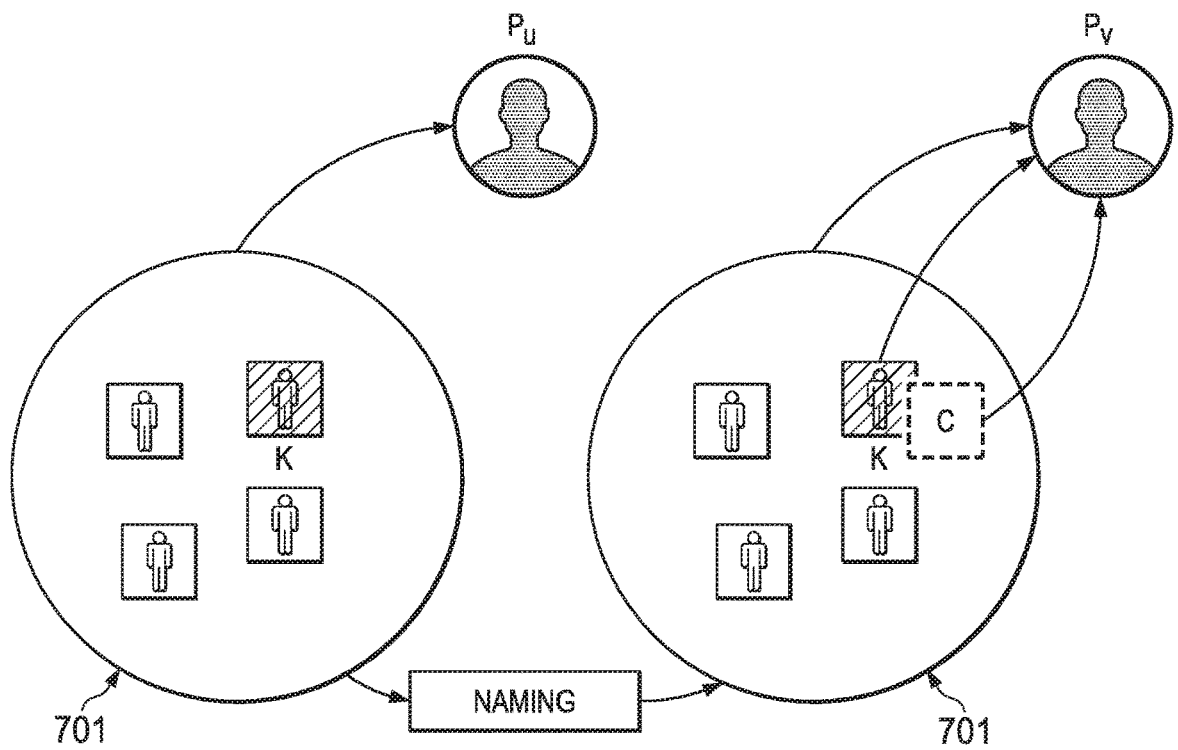
FIG. 7 illustrates conflict resolution in response to a user action that names an unverified cluster, according to an embodiment.

FIG. 7 illustrates conflict resolution in response to a user action that names an unverified cluster, according to an embodiment. Cluster 701 is associated with unverified person $P_U$ and includes a plurality of media assets, including key media asset K. The user names cluster 701 creating verified person $P_V$. Face crop C is created from key media asset K, face crop C becomes a $P_V$ user confirmation (truth face) and key media asset K becomes the key media asset for verified person $P_V$. All media assets in cluster 701 are associated with verified person $P_V$.

Figure 8:
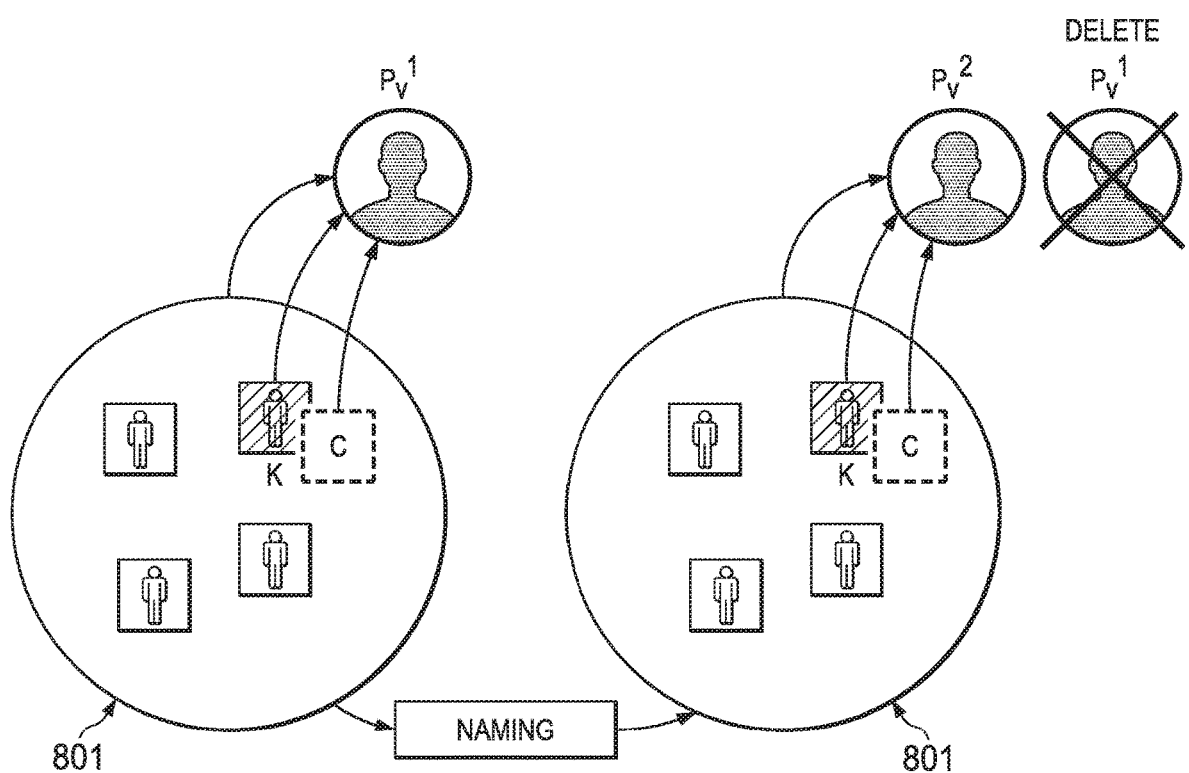
FIG. 8 illustrates conflict resolution in response to a user action that names a verified cluster, according to an embodiment.

FIG. 8 illustrates conflict resolution in response to a user action that names a verified cluster, according to an embodiment. Cluster 801 is associated with verified person $P_V^1$ and includes a plurality of media assets, including key media asset K and face crop image C associated with verified person $P_V^1$. The user renames cluster 801, creating a second verified person $P_V^2$. $P_V^1$ becomes $P_V^2$, face crop C becomes $P_V^2$ user confirmation, K becomes key media asset for $P_V^2$ and $P_V^1$ is deleted.

Figure 9:
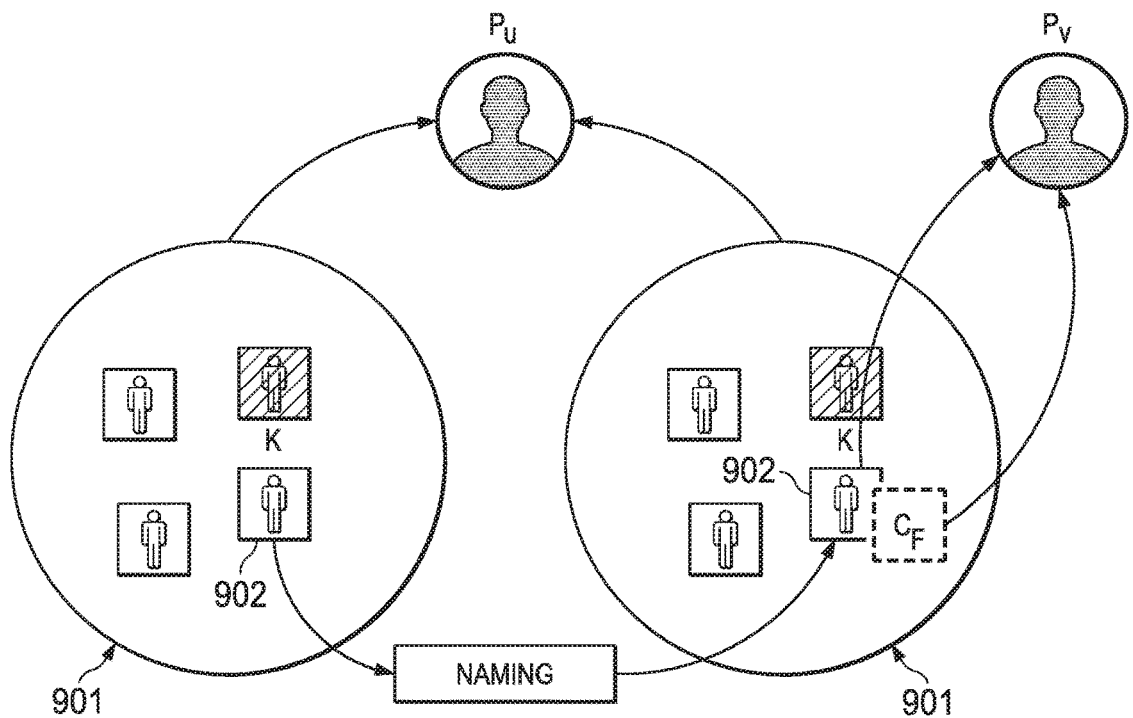
FIG. 9 illustrates conflict resolution in response to a user action that names a single unassigned face, according to an embodiment.

FIG. 9 illustrates conflict resolution in response to a user action that names a single unassigned face, according to an embodiment. Cluster 901 is associated with unverified person $P_U$ and includes a plurality of media assets, including key media asset K. The user names a single unassigned face 902 in cluster 901. Face crop $C_F$ is created from face 902, face crop $C_F$ becomes $P_V$ user confirmation and face 902 is added to $P_V$ confirmation list.

Figure 10:
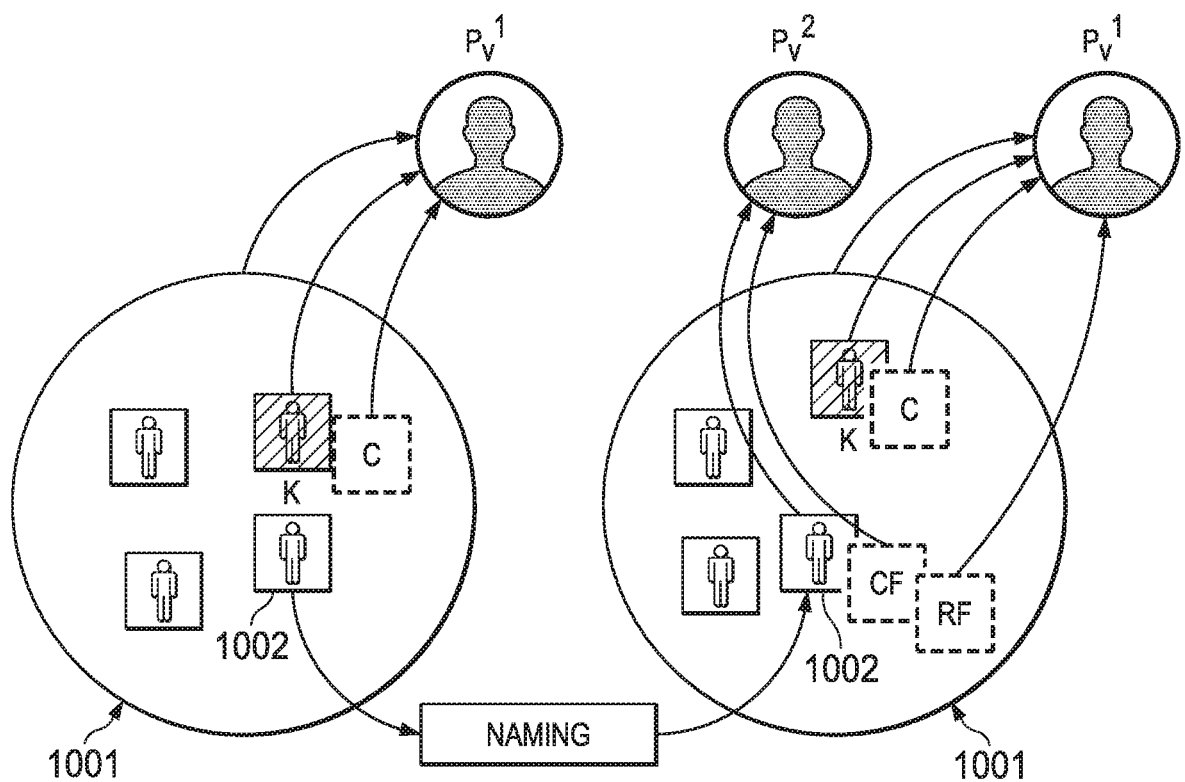
FIG. 10 illustrates conflict resolution in response to a user action that names a single assigned face, according to an embodiment.

FIG. 10 illustrates conflict resolution in response to a user action that names a single assigned face, according to an embodiment. Cluster 1001 is associated with verified person $P_V^1$ and includes a plurality of media assets, including key media asset K and face crop C. The user names single assigned face 1002 in cluster 1001. Face crops $C_F$ and $R_F$ are created from face 1002, face crop $C_F$ becomes $P_V^2$ user confirmation, face crop RF becomes $P_V^1$ user rejection and face 1002 is added to $P_V^2$ confirmation list.

Figure 11:
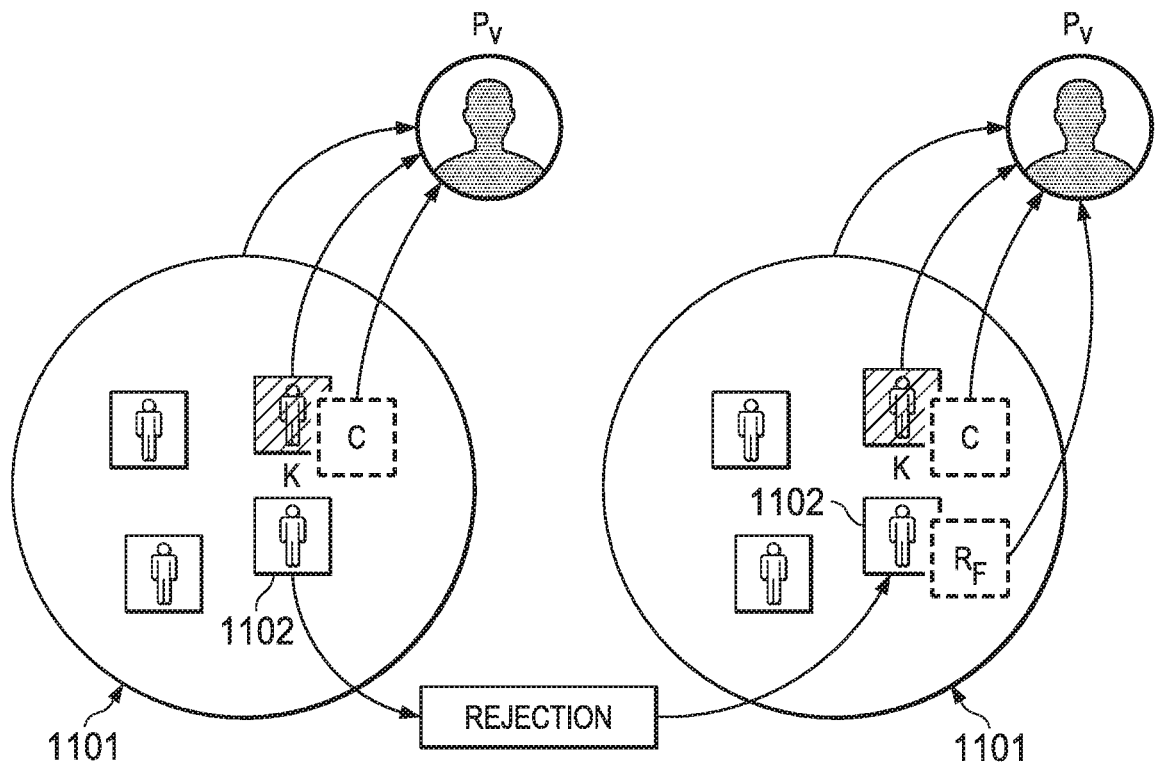
FIG. 11 illustrates conflict resolution in response to a user action that rejects a single face, according to an embodiment.

FIG. 11 illustrates conflict resolution in response to a user action that rejects a single face, according to an embodiment. Cluster 1101 is associated with verified person $P_V$ and includes a plurality of media assets, including key media asset K and face crop C. The user rejects a single face 1102 in cluster 1101. Face crop $R_F$ is created from rejected face 1102, face crop $R_F$ becomes $P_V$ user rejection and rejected face 1102 is added to the $P_V$ rejection list.

Figure 12:
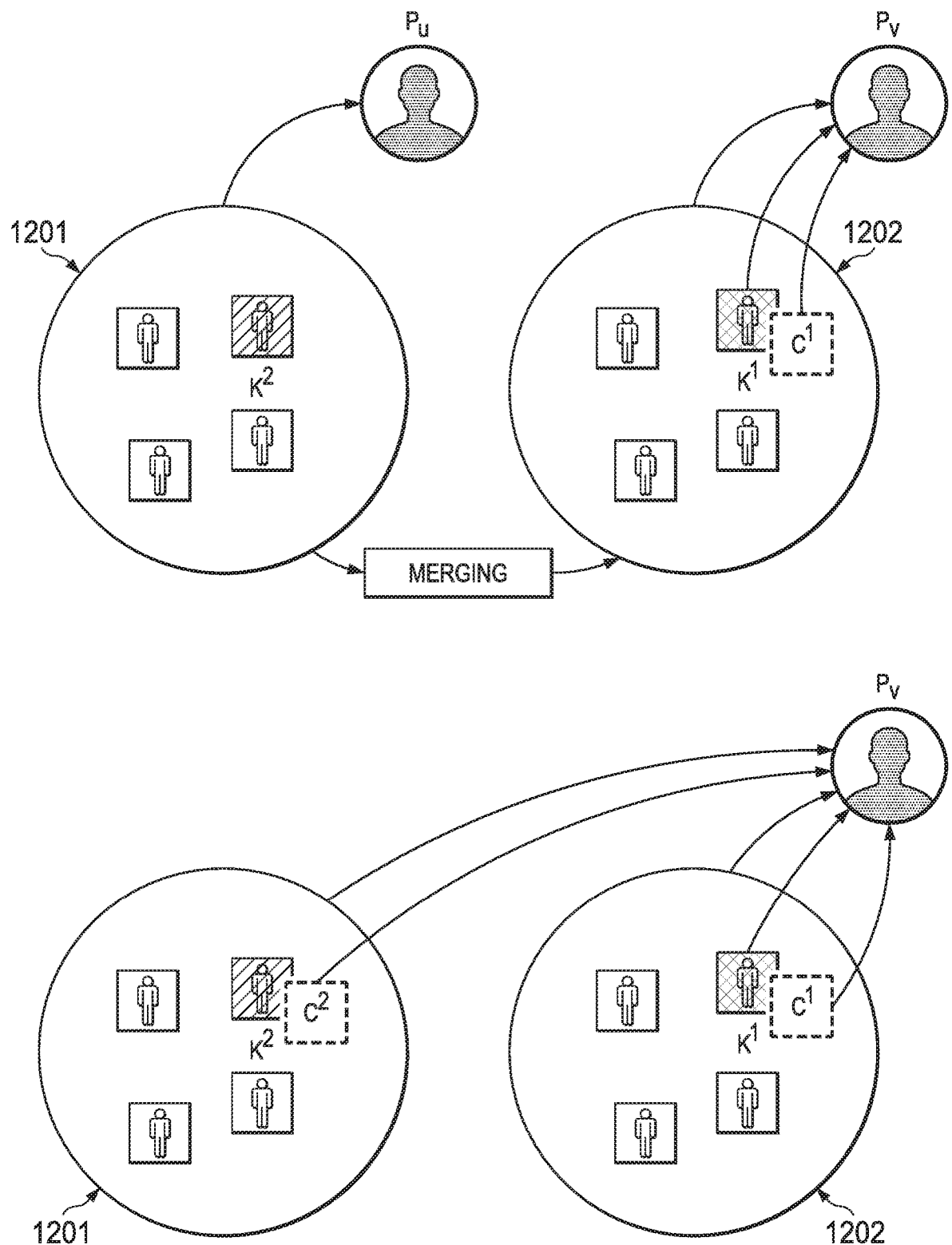
FIG. 12 illustrates conflict resolution in response to a user action that merges an unverified cluster with a verified cluster, according to an embodiment.

FIG. 12 illustrates conflict resolution in response to a user action that merges an unverified cluster with a verified cluster, according to an embodiment. Cluster 1201 is associated with unverified person $P_U$ and includes a plurality of media assets, including key media asset $K^2$. Cluster 1202 is associated with verified person $P_V$ and includes a plurality of media assets, including key media asset $K^1$ and face crop $C^1$. The user merges cluster 1201 with cluster 1202. Face crop $C^2$ is created from key media asset $K^2$ and face crop $C^2$ becomes $P_V$ user confirmation.

Figure 13:
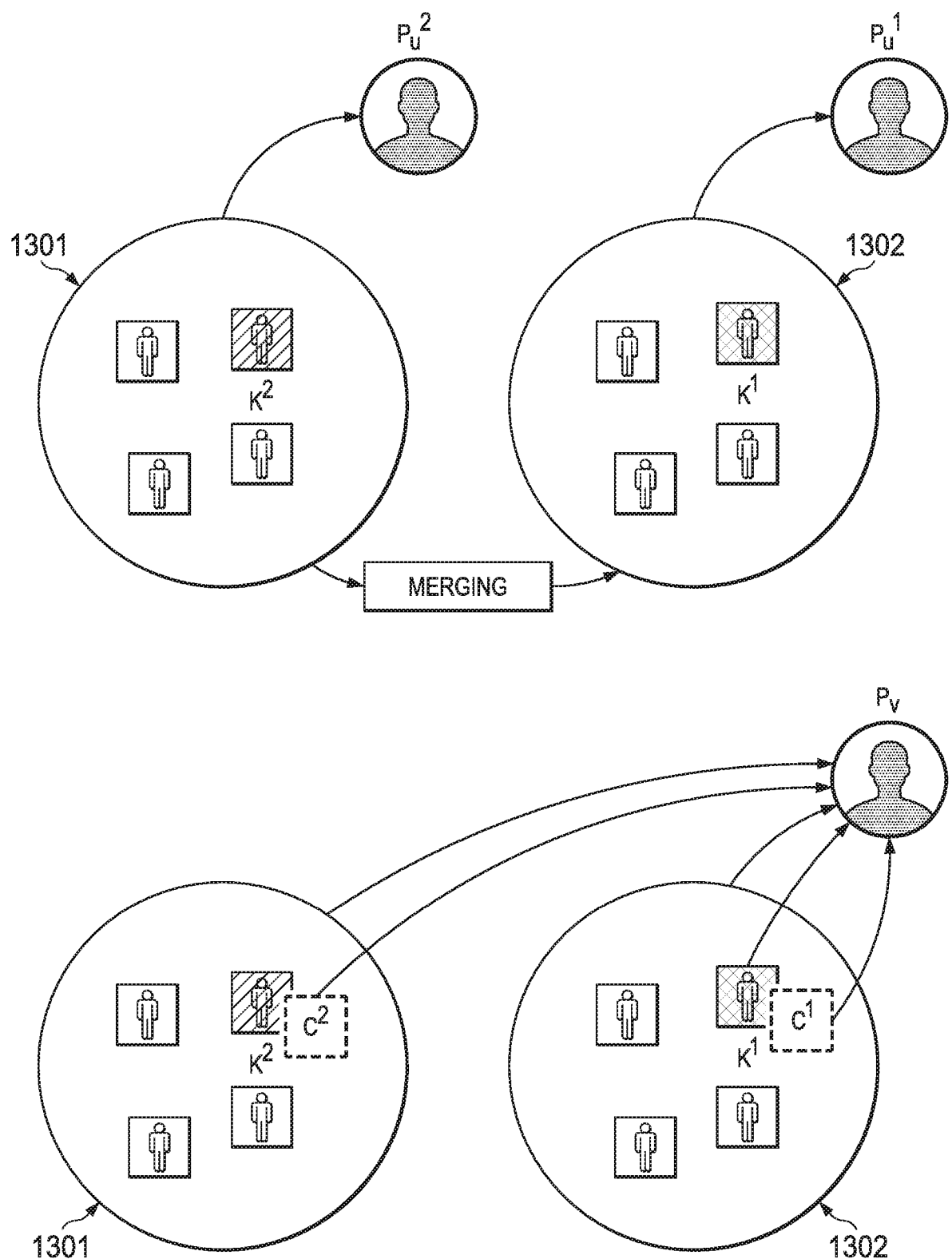
FIG. 13 illustrates conflict resolution in response to a user action that merges an unverified cluster to an unverified cluster, according to an embodiment.

FIG. 13 illustrates conflict resolution in response to a user action that merges an unverified cluster to an unverified cluster, according to an embodiment. Cluster 1301 is associated with unverified person $P_U^2$ and includes a plurality of media assets, including key media asset $K^2$. Cluster 1302 is associated with unverified person $P_U^1$ and includes a plurality of media assets, including key media asset $K^1$. The user merges unverified cluster 1301 with unverified cluster 1302 and creates verified person $P_V$. Face crops $C^1$, $C^2$ are created from key media assets $K^1$, $K^2$, respectively, and face crops $C^1$, $C^2$ becomes $P_V$ user confirmations. $K^1$ becomes $P_V$ key media asset.

Figure 14:
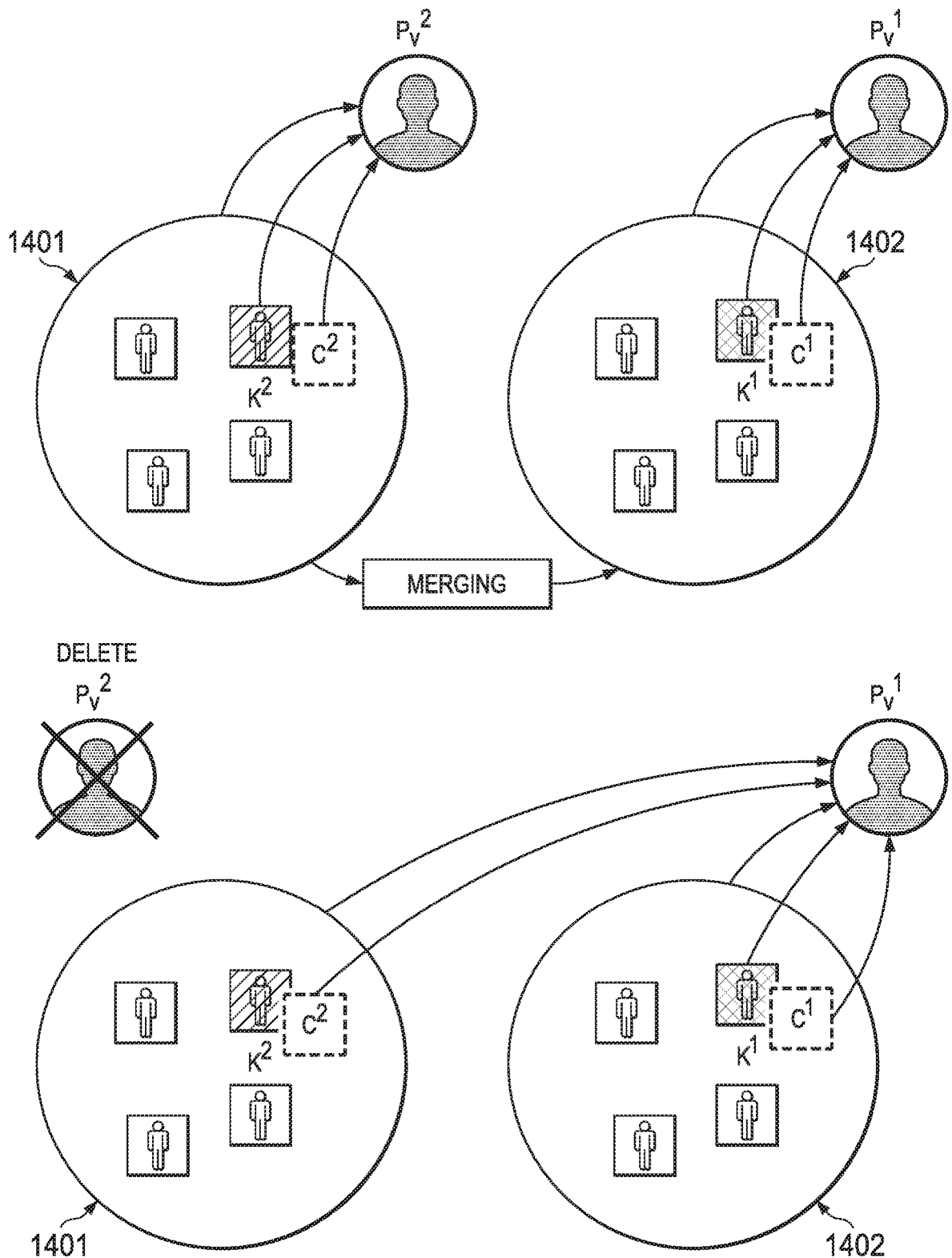
FIG. 14 illustrates conflict resolution in response to a user action that merges a verified cluster to a verified cluster, according to an embodiment.

FIG. 14 illustrates conflict resolution in response to a user action that merges a verified cluster to a verified cluster, according to an embodiment. Cluster 1401 is associated with verified person $P_V^2$ and includes a plurality of media assets, including key media asset $K^2$ and face crop $C^2$. Cluster 1402 is associated with verified person $P_V^1$ and includes a plurality of media assets, including key media asset $K^1$ and face crop $C^1$. The user merges cluster 1401 with cluster 1402. Face crop $C^2$ becomes $P_V^1$ user confirmation and $P_V^2$ is deleted.

Figure 15:
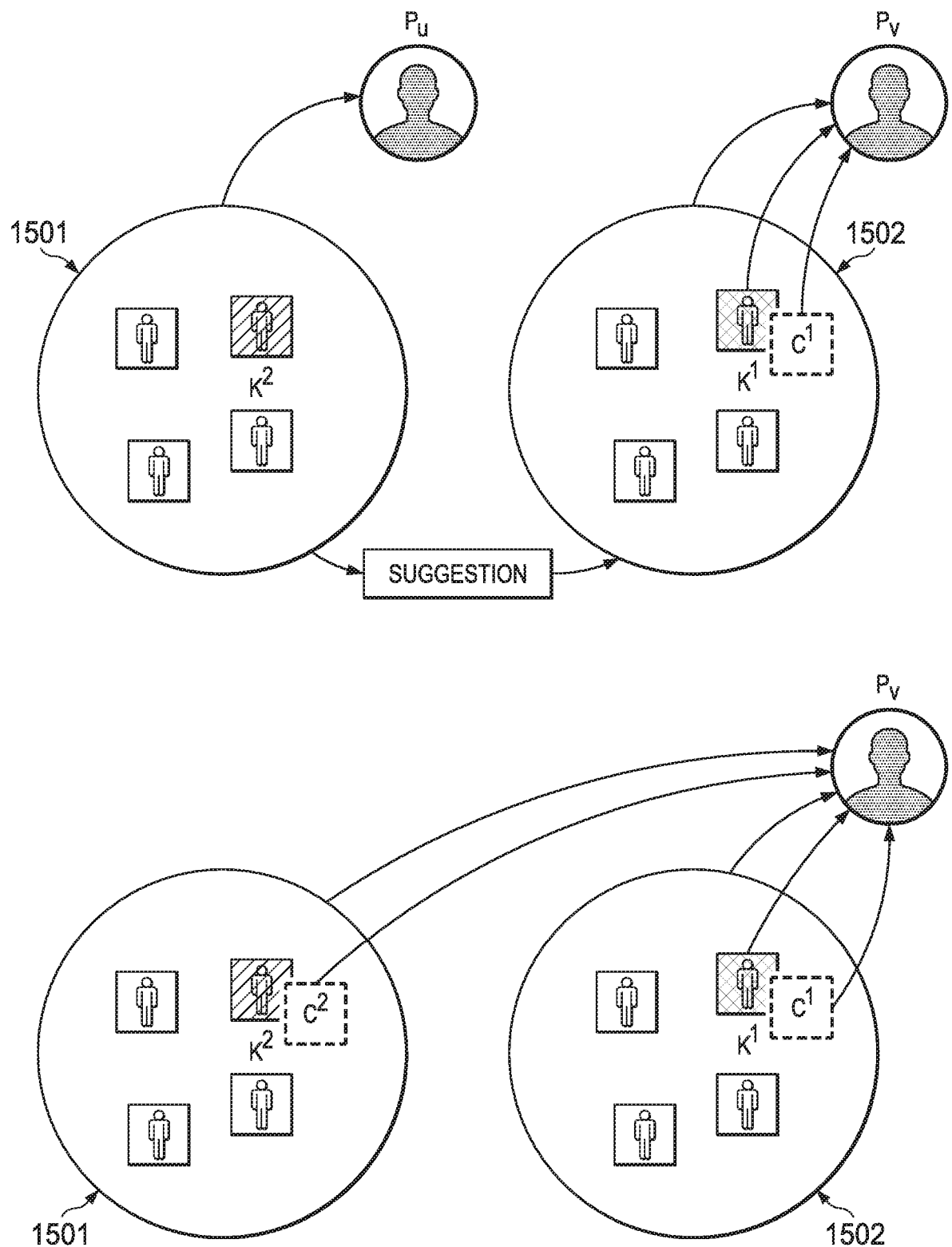
FIG. 15 illustrates conflict resolution in response to a user action that confirms a face suggestion, according to an embodiment.

FIG. 15 illustrates conflict resolution in response to a user action that confirms a face suggestion, according to an embodiment. Cluster 1501 is associated with unverified person $P_U$ and includes a plurality of media assets, including key media asset $K^2$. Cluster 1502 is associated with verified person $P_V$ and includes a plurality of media assets, including key media asset $K^1$ and face crop $C^1$. The user confirms a face in cluster 1501. Face crop $C^2$ is created from key media asset $K^2$ and face crop $C^2$ becomes $P_V$ user confirmation.

Figure 16:
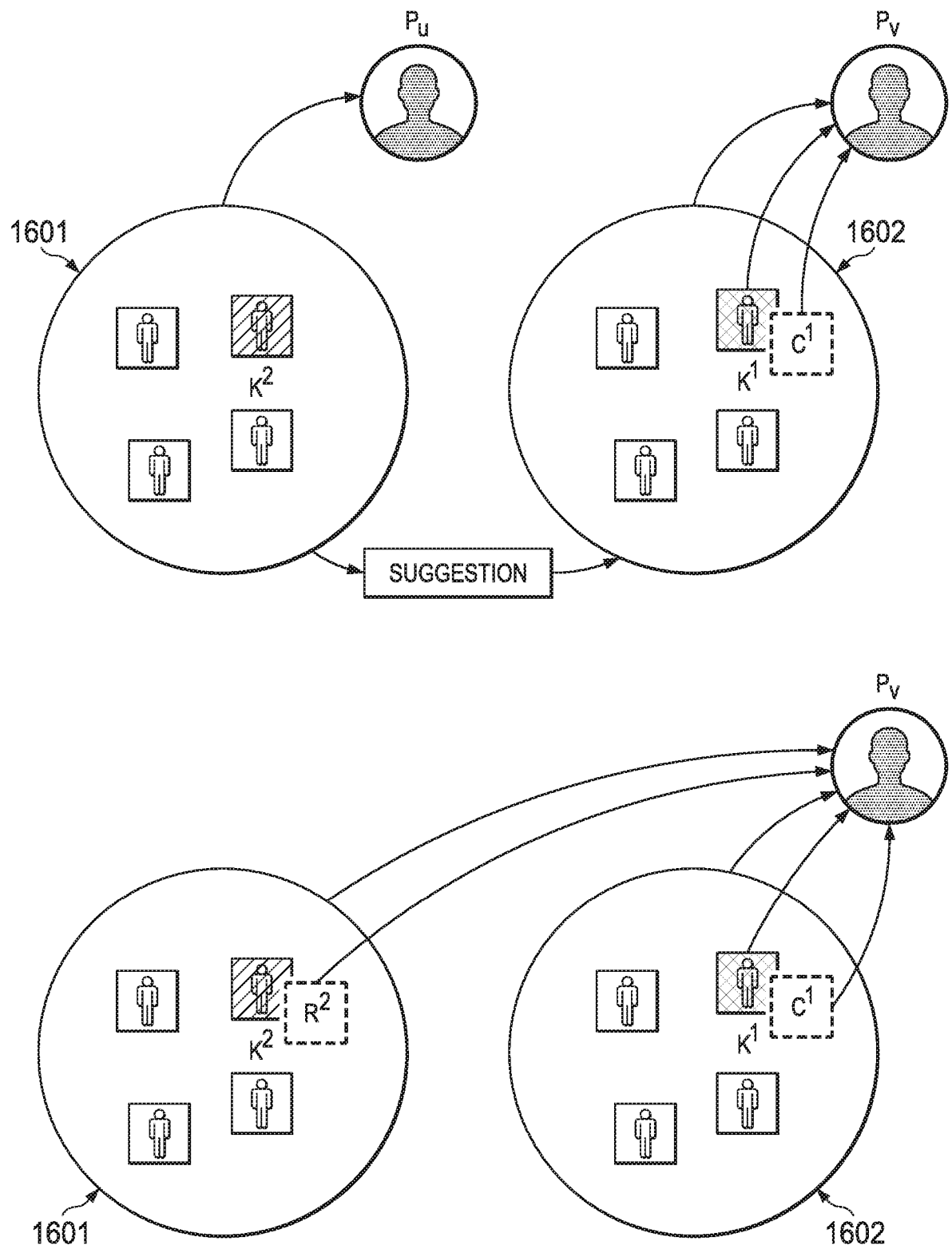
FIG. 16 illustrates conflict resolution in response to a user action that rejects a face suggestion, according to an embodiment.

FIG. 16 illustrates conflict resolution in response to a user action that rejects a face suggestion, according to an embodiment. Cluster 1601 is associated with unverified person $P_U$ and includes a plurality of media assets, including key media asset $K^2$. Cluster 1602 is associated with verified person $P_V$ and includes a plurality of media assets, including key media asset $K^1$ and face crop $C^1$. The user rejects a face in cluster 1601. Face crop $R^2$ is created from key media asset $K^2$ and face crop $R^2$ becomes $P_V$ user rejection.

Figure 17:
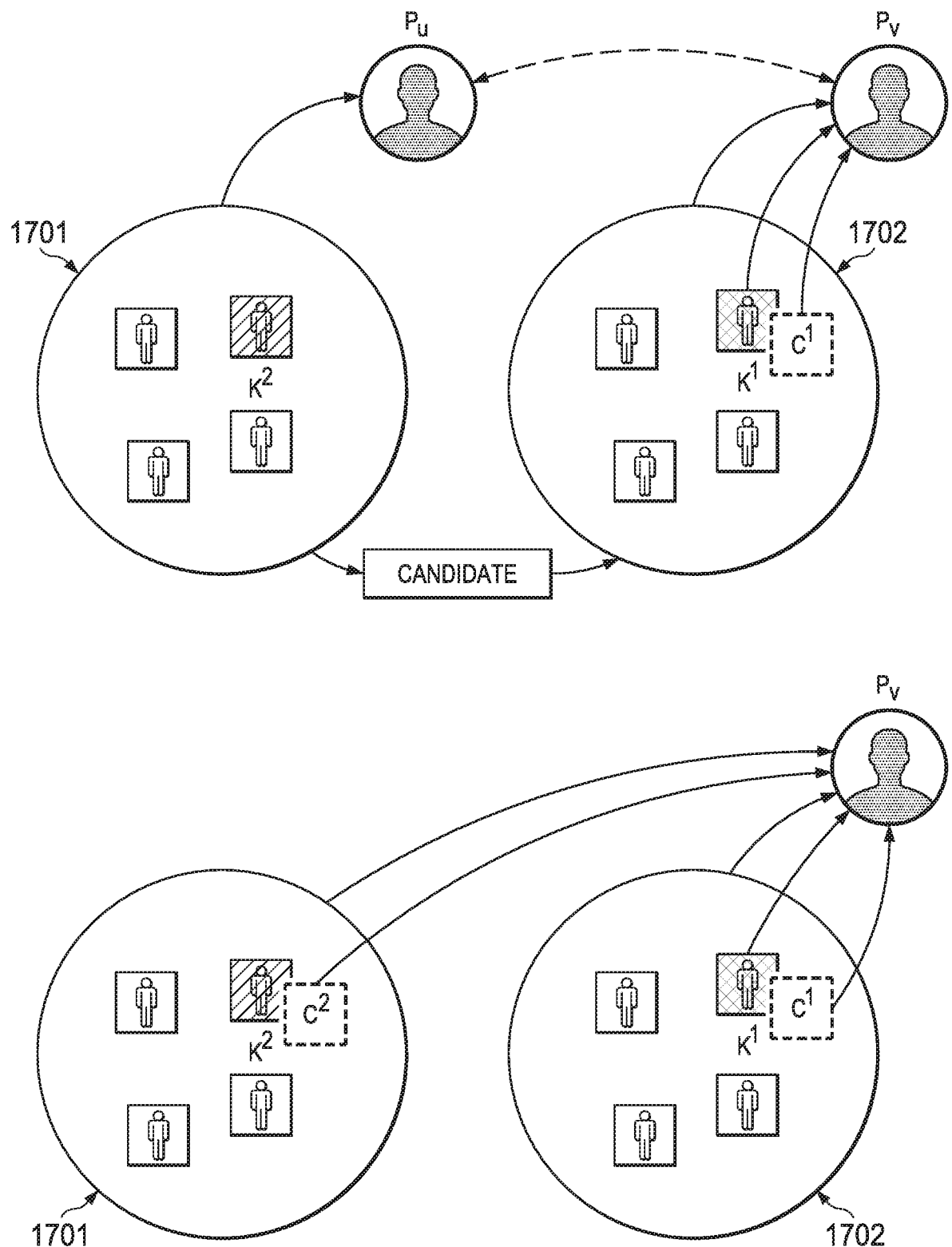
FIG. 17 illustrates conflict resolution in response to a user action that confirms an unverified candidate face to a verified candidate face, according to an embodiment.

FIG. 17 illustrates conflict resolution in response to a user action that confirms an unverified candidate face compared to a verified candidate face, according to an embodiment. Cluster 1701 is associated with unverified person $P_U$ and includes a plurality of media assets, including key media asset $K^2$. Cluster 1702 is associated with verified person $P_V$ and includes a plurality of media assets, including key media asset $K^2$. The user confirms a candidate face in cluster 1701. Face crop $C^2$ is created from key media asset $K^2$, face crop $C^2$ becomes $P_V$ user rejection and the candidate is deleted.

Figure 18:
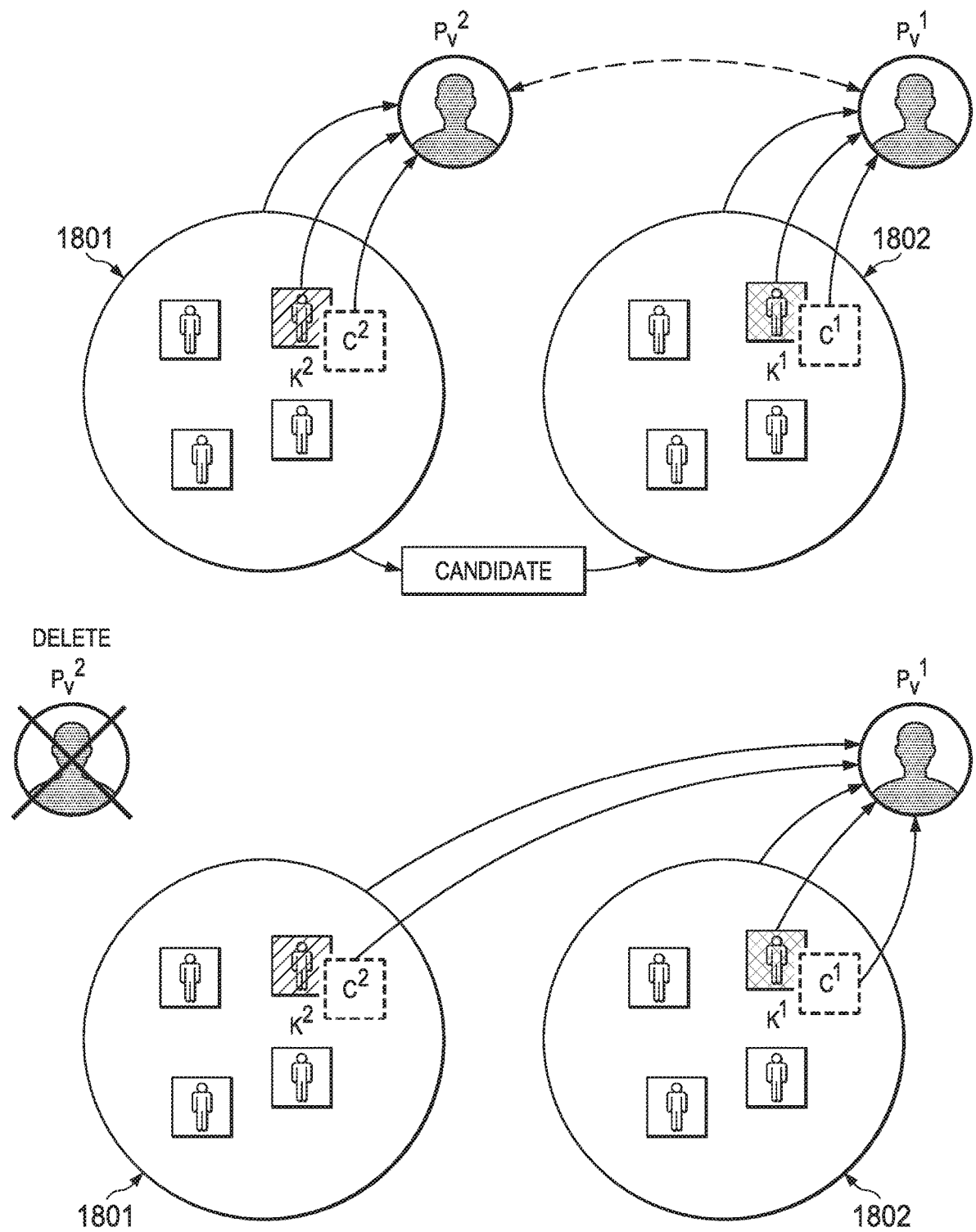
FIG. 18 illustrates conflict resolution in response to a user action that confirms a verified candidate face to a verified candidate face, according to an embodiment.

FIG. 18 illustrates conflict resolution in response to a user action that confirms a verified candidate face compared to a verified candidate face, according to an embodiment. Cluster 1801 is associated with verified person $P_V^2$ and includes a plurality of media assets, including key media asset $K^2$ and face crop $C^2$. Cluster 1802 is associated with verified person $P_V^1$ and includes a plurality of media assets, including key media asset $K^1$ and face crop $C^1$. The user confirms a candidate face in cluster 1801. Face crop $C^2$ becomes $P_V^1$ user confirmation, $P_V^2$ is deleted and the candidate is deleted.

Figure 19:
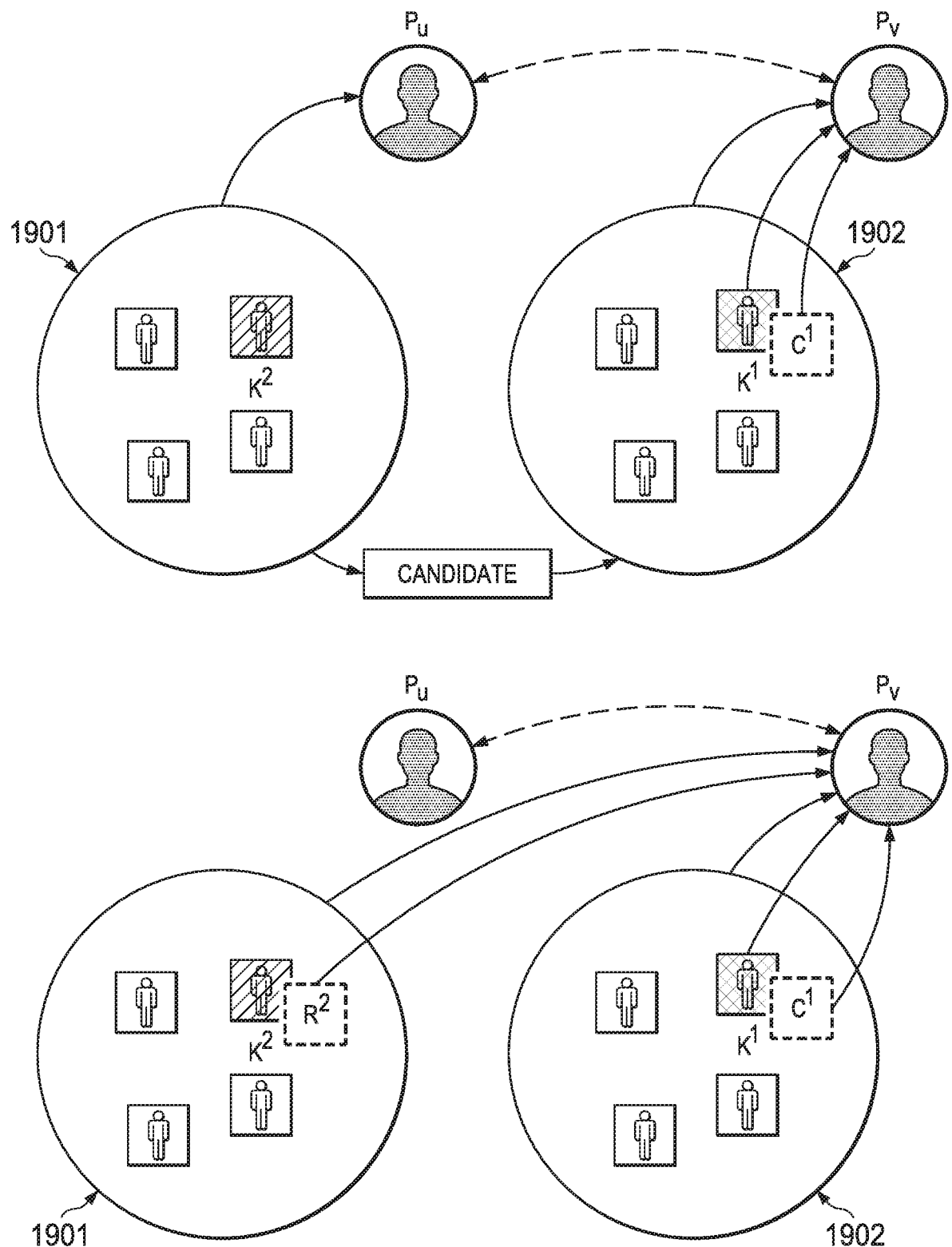
FIG. 19 illustrates conflict resolution in response to a user action that rejects an unverified candidate face to a verified candidate face, according to an embodiment.

FIG. 19 illustrates conflict resolution in response to a user action that rejects an unverified candidate face compared to a verified candidate face, according to an embodiment. Cluster 1901 is associated with unverified person $P_U$ and includes a plurality of media assets, including key media asset $K^2$. Cluster 1902 is associated with verified person $P_V$ and includes a plurality of media assets, including key media asset $K^1$ and face crop $C^1$. The user rejects a candidate face in cluster 1901. Face crop $R^2$ is created from key media asset $K^2$, face crop $R^2$ becomes $P_V$ user confirmation, the candidate is deleted and a candidate rejection between $P_U$, $P_V$ is created.

Figure 20:
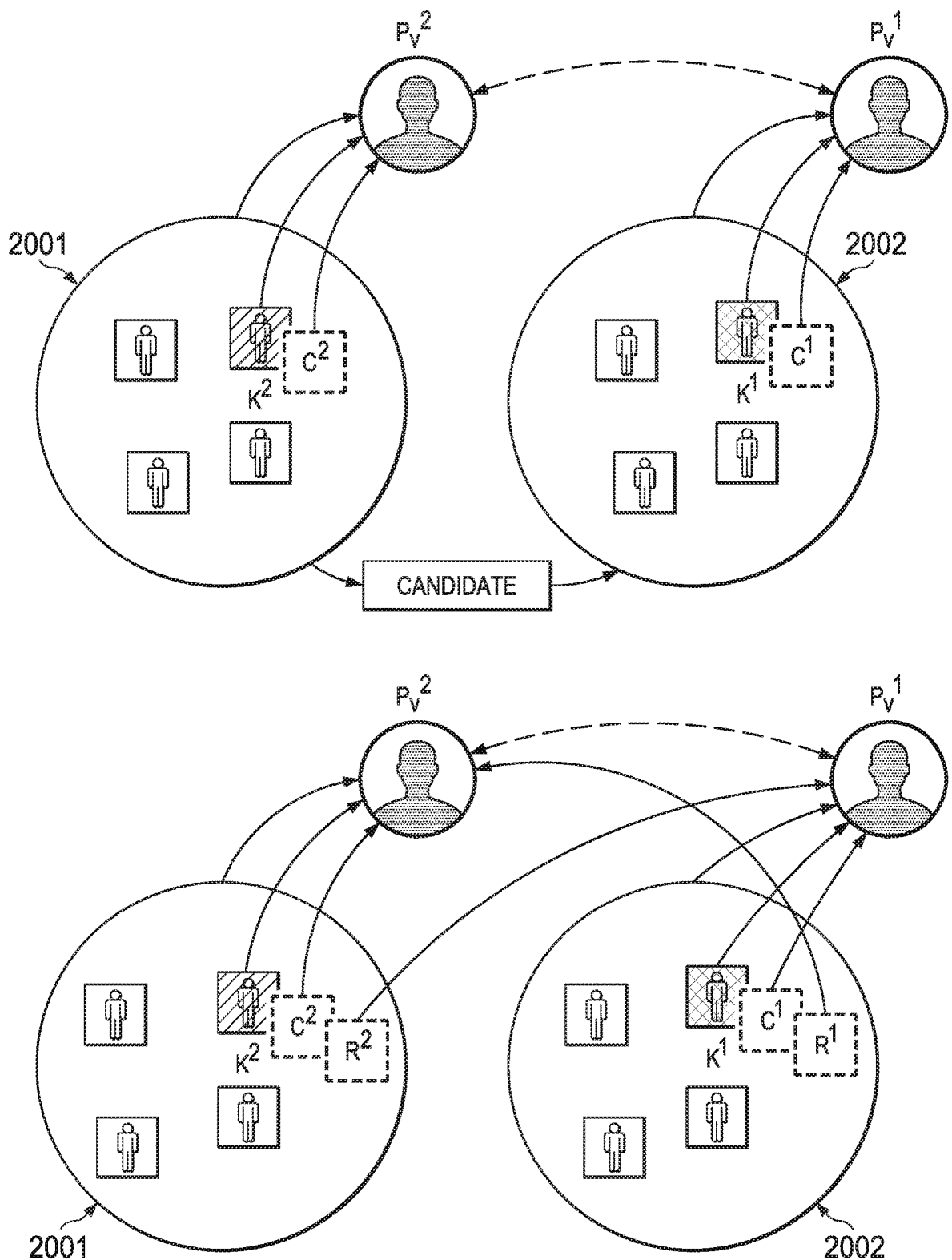
FIG. 20 illustrates conflict, resolution in response to a user action that rejects a verified candidate face to a verified candidate face, according to an embodiment.

FIG. 20 illustrates conflict resolution in response to a user action that rejects a verified candidate face to a verified candidate face, according to an embodiment. Cluster 2001 is associated with verified person $P_V^2$ and includes a plurality of media assets, including key media asset $K^2$ and face crop $C^2$. Cluster 2002 is associated with verified person $P_V^1$ and includes a plurality of media assets, including key media asset $K^1$ and face crop $C^1$. The user rejects a verified candidate face in cluster 2001. Face crops $R^1$, $R^2$ are created from key media assets $K^1$, $K^2$, respectively, face crop $R^1$ becomes $P_V^2$ user rejection, face crop $R^2$ becomes PV1 user rejection, the candidate is deleted and a candidate rejection between $P_U$, $P_V$ is created.

Additional conflict problems may arise that can be resolved using the conflict resolution rules described in Table I below. In the first column of Table I, the initial state of a cluster is described, and in the second column, the action taken to resolve the conflict is described. The same nomenclature is used as before for FIGS. 7-20. Note that L0 refers to a sub structure in the cluster.

TABLE 1

Conflict Resolution Rules

| Rule# | Initial | Action |
|---|---|---|
| 1 | All faces assigned to PU person; no training data available | No operation performed (NOP) |
| 2 | All faces assigned to PU; user confirmation to PV | Assign all faces to PV; user confirmed faces K remain |
| 3 | Some faces assigned to PV person; some faces assigned to PU; user confirmation to PV | Assign all faces to PV; user confirmed faces K remain |
| 4 | Some faces assigned to PV person; some faces assigned to PU person; no user confirmation | Assign all faces to PU; create candidate between PU and PV; user confirmed faces K remain |
| 5 | All faces assigned to PU; candidate between PU and PV1; user confirmation to PV2 | Assign L0 faces to PV2; create candidate between (PV1, PV2) and (PU, PV2); user confirmed faces K remain |

TABLE 1-continued

Conflict Resolution Rules

| Rule# | Initial | Action |
|---|---|---|
| 6 | Some faces assigned to PV1 and PV2; some faces assigned to PU; no user confirmation | Assign all faces to PU; create candidate between PU and PV1; create candidate between PU and PV2; create candidate between PV1 and PV2; user confirmed faces K remain |
| 7 | Some faces assigned to PU; some faces assigned to PV2; user confirmation to PV1 only | Assign PV2 faces to PU; assign all other faces to PV1; create candidate between (PV1, PV2), (PU, PV1) and (PU, PV2); user confirmed faces K remain |
| 8 | Some faces assigned to PU; some faces assigned to verified person PV1; user confirmation to PV1 only; mixed verified and unverified L0 pending candidates | Assign all faces in confirmed L0 to PV1; ignore other faces assigned to PU; user confirmed faces K remain |
| 9 | Some faces assigned to PU; some faces assigned to PV2 and PV3; user confirmation to PV1 | Assign PV2 and PV3 faces to PU; assign all other faces to PV1; create candidate between (PV1, PV2), (PU, PV2), (PV1, PV3), (PU, PV1) and (PU, PV3); user confirmed K faces remain |
| 10 | Some faces assigned to PU; some faces assigned to PV1 and PV2; some faces unverified in L0 with user confirmations; user confirmations to PV1 and PV2 | Assign L0 to respective PV1 and PV2; assign all other faces to PU; create candidate between (PU, PV1), (PU, PV2) and (PV1, PV2); user confirmed faces K remain; keep all other faces to PV2 for precedence |
| 11 | All faces assigned to PU; user confirmations for PV1 and PV2 | Assign L0 to respective PV1 and PV2; assign all other faces to PU; create candidate between (PU, PV1), (PU, PV2) and (PV1, PV2); user confirmed faces K remain. |
| 12 | All faces assigned to PV1; some faces assigned to PU; user confirmation to PV1 and PV2 | Assign L0 faces to PV2; keep all other faces to PV1 for precedence; create candidate between (PV1, PV2), (PU, PV1) and (PU, PV2); user confirmed faces K remain |
| 13 | All faces assigned to PU; user confirmations for PV1 and PV2 and PV3; some faces assigned to PV1 | Assigned L0 to PV2; assign respective single faces to PV1 and PV3; assign all other faces to PU; create candidate between (PU, PV1), (PU, PV2) and (PU, PV3); create candidate between (PV1, PV2), (PV1, PV3) and (PV2, PV3); user confirmed faces K remain; keep all other faces to PV1 for precedence |
| 14 | All faces assigned to PU; user confirmations for PV1 and PV2; user rejections for PV1 and PV2; candidate between (PU, PV1); rejected candidates between (PU, PV2) and (PV1, PV2) | All faces assigned to PU; user confirmation for PV1 and PV2; user rejection for PV1 and PV2; candidate between (PU, PV1); rejected candidates between (PU, PV2) and (PV1, PV2) |
| 15 | Some faces assigned to PV; some faces assigned to PU; user confirmation to PV; user rejection face to PV | Assign all faces to PV; assign rejection face to PU; user confirmed faces K remain |
| 16 | Some faces assigned to PV1; some faces assigned to PU; user confirmation to PV1; user rejection face to PV2 | Assign all faces to PV1; user confirmed faces K remain |
| 17 | Some faces assigned to PV; some faces assigned to PU; user confirmation to PV; user rejection to PV; user rejection face matches confirmation face | Assign all faces to PU |
| 18 | All faces assigned to PU; user confirmation for PV1 and PV2; user rejecting face to PV1 | Assign L0 to respective PV1 and PV2; assign all other faces to PU; create candidate between (PU, PV1) and (PU, PV2); user confirmed faces K remain |
| 19 | Some faces assigned to PV1; some faces assigned to PU; user confirmation to PV1; single face confirmation to PV1 and PV2 | Assign all faces to PV1; single faces confirmation remain; user confirmed faces K remain |
| 20 | Some faces assigned to PV; some faces assigned to PU; user confirmation to PV; some unverified faces from the same media asset A | Assigned all faces to PV; user confirmed faces K remain; unverified faces from the same asset A are quarantined to PU; PU is not a candidate to PV as all its faces are quarantined |

TABLE 1-continued

Conflict Resolution Rules

| Rule# | Initial | Action |
|---|---|---|
| 21 | Some faces assigned to PV; some faces assigned to PU; user confirmation to PV; some faces from the same asset A | Assign all faces to PV; user confirmed faces K remain; unverified faces from the same asset A are quarantined to PU; PU is not a candidate to PV as all its faces are quarantined |
| 22 | All faces assigned to PU; user confirmation for PV1 and PV2; some unverified faces from the same asset A | Assigned L0 to respective PV1 and PV2; assign all other faces to PU; create candidate between (PU, PV1), (PU, PV2) and (PV1, PV2); user confirmed faces K remain; unverified faces from the same asset A are quarantined to PU; PU is a candidate as not all its faces are quarantined |
| 23 | Some faces assigned to PV; some faces assigned to PU; user confirmation to PV; some verified faces from the same asset A | Assign all faces to PV; user confirmed faces K remain; faces from the same asset A become quarantined to PU; PU is not a candidate to PV as all its faces are quarantined |
| 24 | All faces assigned to PU; no training data | NOP |
| 25 | All faces assigned to PV; no training data | NOP |
| 26 | All faces assigned to PU; user confirmation for PV1 and PV2; user rejection for PV1 and PV2; candidate between (PU, PV1); rejected candidates between (PU, PV2) and (PV1, PV2) | All faces assigned to PU; user confirmation for PV1 and PV2; user rejection to PV1 and PV2; candidate between (PU, PV1); rejected candidates between (PU, PV1) and (PV1, PV2) |
| 27 | All faces assigned to PU; user confirmation for PV1 and PV2; user rejection for PV1 and PV2; candidate between (PU, PV1); rejected candidates between (PU, PV2) and (PV1, PV2) | All faces assigned to PU; user confimiation to PV1 and PV2; user rejections to PV1, PV2; candidate between (PU, PV1); rejected candidates between (Pu, PV1) and (PV1, PV2) |
| 28 | All faces to PU; graph confirmation to PV | Assign all faces to PV; graph confirmed faces G remain; PP: Graph confirmed face G is unchanged |
| 29 | All faces assigned to PU; two graph confirmed faces | Action-preprocessor only; only one graph confirmed face remains; only one graph confirmed person remains; it should be the one with the lowest GUID; all graph confirmed faces associated with the deleted person become unassigned |
| 30 | All faces assigned to PU; Two graph confirmed faces | Action pre-processor only; only the user confirmed face remains; the graph confirmed person is deleted; the graph confirmed face is also deleted; all graph confirmed faces become unassigned |
| 31 | All faces assigned to PU; two graph confirmed faces | Action pre-processor only; only two user confirmed faces remain; the graph confirmed person is deleted; the graph confirmed face is also deleted; all graph confirmed faces become unassigned |
| 32 | Some faces assigned to PU; some faces assigned to PV1; user confirmation to PV1 only; mixed verified and unverified L0 pending candidates | Assign all faces in confirmed L0 to PV1; ignore other faces assigned to PU; user confirmed faces K remain |

Example Process

Figure 21:
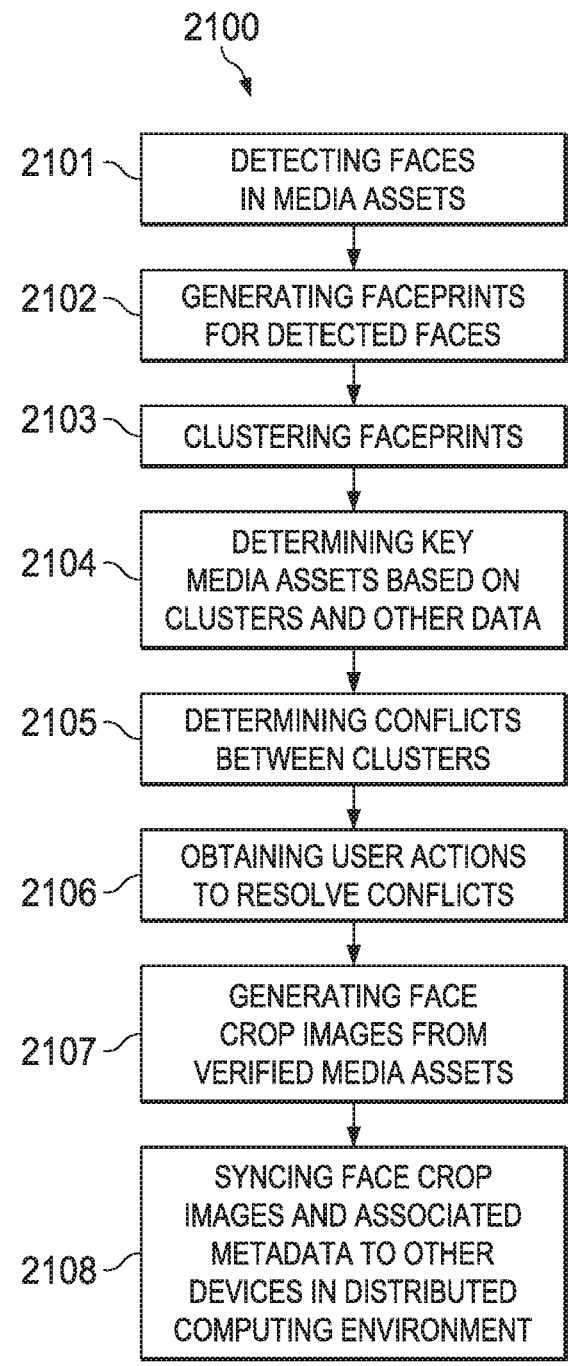
FIG. 21 is a flow diagram of an example process of face detection in a distributed computing environment, according to an embodiment.
Figure 22:
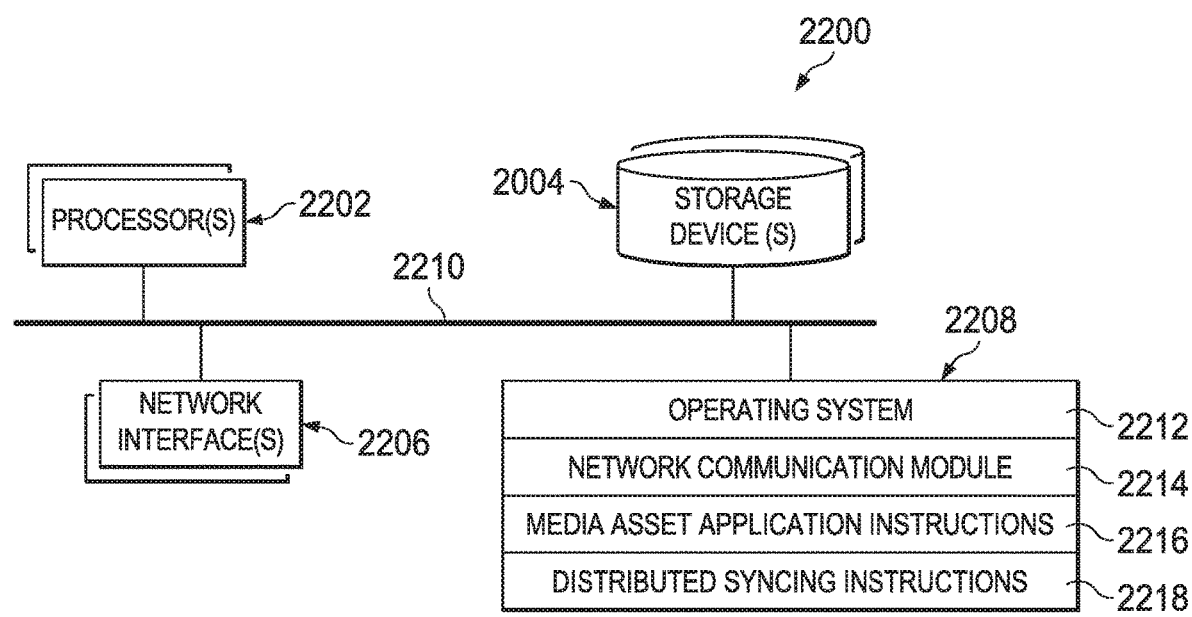
FIG. 22 illustrates an example server architecture, implementing the service-side features and operations described in reference to FIGS. 1-21.
Figure 23:
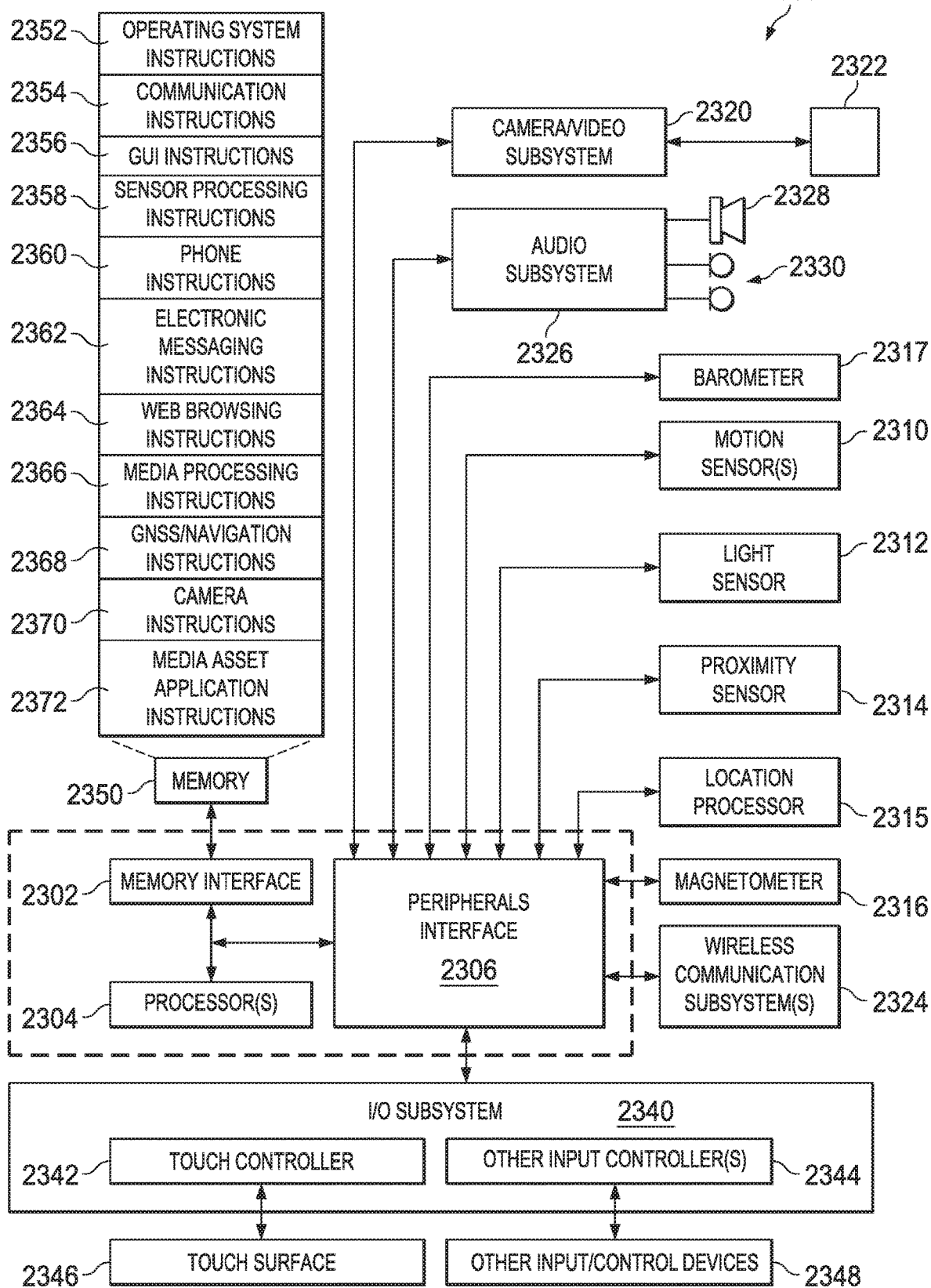
FIG. 23 illustrates an example device architecture of a mobile device implementing client-side features and operations described in reference to FIGS. 1-21.

FIG. 21 is a flow diagram of an example process 2100 of face detection data in a distributed computing environment, according to an embodiment Process 2100 can be implemented by architectures 2200 and 2300, as described in reference to FIGS. 22 and 23, respectively.

Process 2100 can begin by detecting faces in media assets (2101). For example, a local face detection process is applied to media assets stored in a local media asset library. One or more faces may be detected in each media asset. Any suitable face detection technology can be used, including but not limited to face detection technology that uses appearance-based methods and that rely on statistical analysis and machine learning to find relevant characteristics of face and non-face images. The learned characteristics can be in the form of distribution models or discriminant functions that are used for face detection.

Process 2100 continues by generating faceprints for detected faces (2102). For example, faceprints can be derived from an image can be used as a random variable that that is characterized for faces and non-faces using Bayesian classification, or maximum likelihood, to classify a candidate image location as face or non-face. In an embodiment, a faceprint is a feature vector defined in n-space that uniquely identifies a face image but does not associate a name with the face.

Process 2100 continues by clustering faceprints (2103). Any suitable clustering technique can be used to cluster faceprints, including but not limited to k-means, HCA, and DBSCAN. The result of the clustering is one or more clusters of faceprints. For example, a cluster can include 10 faceprints associated with 10 or less different media assets. When a cluster is generated it may be unverified meaning that the faces associated with the cluster are not associated with a name. Some of the faces may have been incorrectly clustered. For example, faces of two different people may have been placed in the same cluster.

Process 2100 continues by obtaining key media assets based on the clusters and other data (2104). The key media assets can be selected based on any suitable criteria. In an embodiment, the key media assets are selected based on the centroids of clusters. For example, the media asset in a cluster that has a faceprint that is nearest to the centroid of the cluster can be selected as the key media asset. Additionally, the key media asset can be based on other data, such as specific attributes of the media asset, including but not limited to: whether the face in the media asset is smiling, whether the face is a frontal view or rotated, whether the face is in the background or foreground, the quality of the lighting, location, noise or blurriness, type of media asset (e.g., photo, video frame) and any other suitable criteria.

Process 2100 continues by determining conflicts between faceprints in clusters (2105). For example, some clusters may be associated with two key media assets or face crop images.

Process 2100 continues by obtaining user actions to resolve conflicts (2106). For example, various GUIs are presented to the user that display media assets associated with a cluster or a single media asset and request that the user take certain user actions with respect to the media asset(s). For example, various affordances are provided by the GUI that allow the user to add names to faces in a cluster, merge face clusters, confirm or reject names assigned to faces and confirm or reject suggested names for faces.

Process 2100 continues by generating face crops from verified media assets (2107). For example, after a user verifies a key media asset or other verified media asset (e.g., a single face image), a face crop image is generated from the verified key media asset or other verified media asset. In an embodiment, the face crop image is a thumbnail image.

Process 2100 continues by syncing face crop images and associated metadata to other devices in the distributed computing environment (2108). For example, the face crop images and metadata associated with the user action that verified or rejected the image data is sent to server computers for syncing with other client devices in a distributed computing environment. In an embodiment, the face crop images and metadata are encrypted prior to sending to the server computers. During syncing, the face detection data is transferred to the user's other client devices. The face crop image is treated like any other media asset on each client device and is included in the local clustering on client device 103 and processed as described above. The face crop will be included in a cluster and every faceprint in the same cluster wilt be associated with the person associated with the face crop image and associated metadata (e.g., name, contact ID, "favorites", "likes"). This results in the cluster of media assets being verified. Any conflicts that arise on the client device as a result of syncing can be result through user actions, as described in reference to FIGS. 7-20. For example, if clustering was performed while a device is offline, two face crop images may be present in a single cluster. The user will be presented with a GUI to resolve the conflict by selecting one of the two face crop images to be the truth face.

Example Server Architecture

FIG. 22 is a block diagram of example server architecture 2200 for implementing the server-side features and processes described in reference to FIGS. 1-21, according to an embodiment. Other architectures are possible, including architectures with more or fewer components. In some implementations, architecture 2200 includes one or more processor(s) 2202 (e.g., dual-core Intel® Xeon® processors), one or more network interface(s) 2206, one or more storage device(s) 2204 (e.g., hard disk, optical disk, flash memory) and one or more computer-readable medium(s) 2208 (e.g., hard disk, optical disk, flash memory, etc.). These components can exchange communications and data over one or more communication channel(s) 2210 (e.g., buses), which can utilize various hardware and software for facilitating the transfer of data and control signals between components.

The term "computer-readable medium" refers to any storage medium that stores and provides instructions to processor(s) 2202 for execution, including without limitation, non-volatile media (e.g., optical or magnetic disks, ROM) and volatile media (e.g., memory, RAM). Computer-readable medium(s) 2208 can further include computer program instructions for implementing operating system 2212 (e.g., Mac OS® server, Windows® NT server), network communication stack 2214, media asset application 2216 and distributed syncing, as described in reference to FIGS. 1-21. Computer program instructions can be based on any suitable computer language (e.g., C++, Java).

Operating system 2212 can be multi-user, multiprocessing, multitasking, multithreading, real time, etc. Operating system 2212 performs basic tasks, including but not limited to: recognizing input from and providing output to devices 2202, 2204, 2206 and 2208; keeping track and managing files and directories on computer-readable medium(s) 2208 (e.g., memory or a storage device); controlling peripheral devices; and managing traffic on the one or more communication channel(s) 2210. Network communications stack 2213 includes various components for establishing and maintaining network connections (e.g., software for implementing communication protocols, such as TCP/IP, HTTP, etc.).

Architecture 2200 can be included in any computer device, including one or more server computers in a local or distributed network each having one or more processing cores. Architecture 2200 can be implemented in a parallel processing or peer-to-peer infrastructure or on a single device with one or more processors. Software can include multiple software components or can be a single body of code.

Example Mobile Device Architecture

FIG. 23 illustrates an example device architecture 2300 of a mobile device implementing client-side features and operations described in reference to FIGS. 1-21. Architecture 2300 can include memory interface 2302, one or more data processors, image processors and/or processors 2304 and peripherals interface 2306. Memory interface 2302, one or more processors 2304 and/or peripherals interface 2306 can be separate components or can be integrated in one or more integrated circuits. The various components in architecture 2300 can be coupled by one or more communication buses or signal lines.

Sensors, devices and subsystems can be coupled to peripherals interface 2306 to facilitate multiple functionalities. For example, one or more motion sensors 2310, light sensor 2312 and proximity sensor 2314 can be coupled to peripherals interface 2306 to facilitate motion sensing (e.g., acceleration, rotation rates), lighting and proximity functions of the mobile device. Location processor 2315 can be connected to peripherals interface 2306 to provide geopositioning. In some implementations, location processor 2315 can be a GNSS receiver, such as the Global Positioning System (GPS). Electronic magnetometer 2316 (e.g., an integrated circuit chip) can also be connected to peripherals interface 2306 to provide data that can be used to determine the direction of magnetic North. Electronic magnetometer 2316 can provide data to an electronic compass application. Motion sensors) 2310 can include one or more accelerometers and/or gyros configured to determine change of speed and direction of movement of the mobile device. Barometer 2317 can be configured to measure atmospheric pressure around the mobile device.

Camera subsystem 2320 and an optical sensor 2322, e.g., a charged coupled device (CCD) or a complementary metal-oxide semiconductor (CMOS) optical sensor, can be utilized to facilitate camera functions, such as capturing photographs and recording video clips.

Communication functions can be facilitated through one or more wireless communication subsystems 2324, which can include radio frequency (RF) receivers and transmitters (or transceivers) and/or optical (e.g., infrared) receivers and transmitters. The specific design and implementation of the communication subsystem 2324 can depend on the communication network(s) over which a mobile device is intended to operate. For example, architecture 2300 can include communication subsystems 2324 designed to operate over a GSM network, a GPRS network, an EDGE network, a Wi-Fi™ or WiMax™ network and a Bluetooth™ network. In particular, the wireless communication subsystems 2324 can include hosting protocols, such that the mobile device can be configured as a base station for other wireless devices.

Audio subsystem 2326 can be coupled to a speaker 2328 and a microphone 2330 to facilitate voice-enabled functions, such as voice recognition, voice replication, digital recording and telephony functions. Audio subsystem 2326 can be configured to receive voice commands from the user.

I/O subsystem 2340 can include touch surface controller 2342 and/or other input controller(s) 2344. Touch surface controller 2342 can be coupled to a touch surface 2346 or pad. Touch surface 2346 and touch surface controller 2342 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 2346. Touch surface 2346 can include, for example, a touch screen. I/O subsystem 2340 can include a haptic engine or device for providing haptic feedback (e.g., vibration) in response to commands from a processor.

Other input controller(s) 2344 can be coupled to other input/control devices 2348, such as one or more buttons, rocker switches, thumb-wheel, infrared port, USB port and/or a pointer device such as a stylus. The one or more buttons (not shown) can include an up/down button for volume control of speaker 2328 and/or microphone 2330. Touch surface 2346 or other controllers 2344 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 2346; and a pressing of the button for a second duration that is longer than the first duration may turn power to the mobile device on or off. The user may be able to customize a functionality of one or more of the buttons. The touch surface 2346 can, for example, also be used to implement virtual or soft buttons and/or a virtual touch keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 2302 can be coupled to memory 2350. Memory 2350 can include high-speed random access memory and/or non-volatile memory, such as one or more magnetic disk storage devices, one or more optical storage devices and/or flash memory (e.g., NAND, NOR). Memory 2350 can store operating system 2352, such as iOS, Darwin, RTXC, LINUX, UNIX, OS X, WINDOWS, or an embedded operating system such as VxWorks. Operating system 2352 may include instructions for handling basic system services and for performing hardware dependent tasks. In some implementations, operating system 2352 can include a kernel (e.g., UNIX kernel).

Memory 2350 may also store communication instructions 2354 to facilitate communicating with one or more additional devices, one or more computers and/or one or more servers, such as, for example, instructions for implementing a software stack for wired or wireless communications with other devices. Memory 2350 may include graphical user interface instructions 2356 to facilitate graphic user interface processing; sensor processing instructions 2358 to facilitate sensor-related processing and functions; phone instructions 2360 to facilitate phone-related processes and functions; electronic messaging instructions 2362 to facilitate electronic-messaging related processes and functions; web browsing instructions 2364 to facilitate web browsing-related processes and functions; media processing instructions 2366 to facilitate media processing-related processes and functions; GNSS/Location instructions 2368 to facilitate generic GNSS and location-related processes and instructions; and camera instructions 2370 to facilitate camera-related processes and functions. Memory 2350 further includes client face syncing instructions 2372 for performing the client-side features and processes described in reference to FIGS. 1-21. The memory 2350 may also store other software instructions (not shown), such as security instructions, web video instructions to facilitate web video-related processes and functions and/or web shopping instructions to facilitate web shopping-related processes and functions. In some implementations, the media processing instructions 2366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 2350 can include additional instructions or fewer instructions. Furthermore, various functions of the mobile device may be implemented in hardware and/or in software, including in one or more signal processing and/or application specific integrated circuits.

One or more features or steps of the disclosed embodiments may be implemented using an Application Programming Interface (API). An API may define on or more parameters that are passed between a calling application and other software code an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally, recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method, comprising:
    displaying, in a graphical user interface (GUI), a media asset comprising a first face indicated by a first window marking the first face;
    determining a candidate person that belongs to the first face;
    presenting, in the GUI, a query requesting user input about whether the first face belongs to the candidate person;
    receiving user input indicating that the first face does not belong to the candidate person; and
    associating metadata with the media asset, the metadata:
        a) describing that the first face does not belong to the candidate person, and b) not identifying another person to associate with the first face.

2. The method of claim 1, wherein the media asset is encrypted to protect user privacy, the method further comprising decrypting the media asset prior to determining the candidate person that belongs to the first face.

3. The method of claim 1, further comprising:
generating a faceprint for the first face;
receiving additional user input identifying a person that belongs to the first face; and
clustering the faceprint into a cluster comprising one or more additional faceprints specific to the user-identified person.

4. The method of claim 3, further comprising disassociating the candidate person from any cluster to which the faceprint for the first face is assigned.

5. The method of claim 3, further comprising:
determining a conflict due to at least one faceprint in the cluster representing a different person;
obtaining a user action to resolve the conflict; and
adjusting the cluster to resolve the conflict according to the user action.

6. The method of claim 5, wherein obtaining the user action to resolve the conflict further comprises:
displaying one or more media assets associated with one or more clusters in the GUI; and
receiving second user input that names faces on the one or more displayed media assets.

7. The method of claim 5, wherein obtaining the user action to resolve the conflict further comprises:
displaying one or more media assets associated with one or more clusters in the GUI; and
receiving second user input that merges one or more displayed media assets.

8. The method of claim 7, wherein the second user input includes merging two unverified media assets.

9. A system, comprising:
one or more processors;
memory coupled to the one or more processors and configured to store instructions, which, when executed by the one or more processors, causes the one or more processors to perform operations comprising:
displaying, in a graphical user interface (GUI), a media asset comprising a first face indicated by a first window marking the first face;
determining a candidate person that belongs to the first face;
presenting, in the GUI, a query requesting user input about whether the first face belongs to the candidate person;
receiving user input indicating that the first face does not belong to the candidate person; and
associating metadata with the media asset, the metadata: a) describing that the first face does not belong to the candidate person, and b) not identifying another person to associate with the first face.

10. The system of claim 9, wherein the media asset is encrypted to protect user privacy, the operations further comprising decrypting the media asset prior to determining the candidate person that belongs to the first face.

11. The system of claim 9, wherein the operations further comprise:
generating a faceprint for the first face;
receiving additional user input identifying a person that belongs to the first face; and
clustering the faceprint into a cluster comprising one or more additional faceprints specific to the user-identified person.

12. The system of claim 11, wherein the operations further comprise disassociating the candidate person from any cluster to which the faceprint for the first face is assigned.

13. The system of claim 11, wherein the operations further comprise:
determining a conflict due to at least one faceprint in the cluster representing a different person;
obtaining a user action to resolve the conflict; and
adjusting the cluster to resolve the conflict according to the user action.

14. The system of claim 13, wherein obtaining the user action to resolve the conflict further comprises:
displaying one or more media assets associated with one or more clusters in the GUI; and
receiving second user input that names faces on the one or more displayed media assets.

15. The system of claim 13, wherein obtaining the user action to resolve the conflict further comprises:
displaying one or more media assets associated with one or more clusters in the GUI; and
receiving second user input that merges one or more displayed media assets.

16. The system of claim 15, wherein the second user input includes merging two unverified media assets.

17. A non-transitory computer-readable medium including one or more sequences of instructions that, when executed by one or more processors, cause the one or more processors to perform operations comprising:
displaying, in a graphical user interface (GUI), a media asset comprising a first face indicated by a first window marking the first face;
determining a candidate person that belongs to the first face;
presenting, in the GUI, a query requesting user input about whether the first face belongs to the candidate person;
receiving user input indicating that the first face does not belong to the candidate person; and
associating metadata with the media asset, the metadata: a) describing that the first face does not belong to the candidate person, and b) not identifying another person to associate with the first face.

18. The non-transitory computer-readable medium of claim 17, wherein the media asset is encrypted to protect user privacy, the operations further comprising decrypting the media asset prior to determining the candidate person that belongs to the first face.

19. The non-transitory computer-readable medium of claim 17, wherein the operations further comprise:
generating a faceprint for the first face;
receiving additional user input identifying a person that belongs to the first face; and
clustering the faceprint into a cluster comprising one or more additional faceprints specific to the user-identified person.

20. The non-transitory computer-readable medium of claim 19, wherein the operations further comprise:
determining a conflict due to at least one faceprint in the cluster representing a different person;
obtaining a user action to resolve the conflict; and
adjusting the cluster to resolve the conflict according to the user action.

* * * * *